(12) United States Patent
Rasmussen

(10) Patent No.: US 7,593,454 B2
(45) Date of Patent: Sep. 22, 2009

(54) ENHANCED QPSK OR DQPSK DATA DEMODULATION FOR DIRECT SEQUENCE SPREADING (DSS) SYSTEM WAVEFORMS USING ORTHOGONAL OR NEAR-ORTHOGONAL SPREADING SEQUENCES

(75) Inventor: Donald John Rasmussen, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 775 days.

(21) Appl. No.: 11/314,123

(22) Filed: Dec. 21, 2005

(65) Prior Publication Data

US 2007/0025430 A1 Feb. 1, 2007

Related U.S. Application Data

(60) Provisional application No. 60/703,316, filed on Jul. 28, 2005.

(51) Int. Cl.
*H04B 1/00* (2006.01)
*H04L 7/00* (2006.01)
(52) U.S. Cl. ................................. 375/150; 375/355
(58) Field of Classification Search ................ 375/130, 375/136, 137, 140, 147, 149, 150, 152, 316, 375/329–331, 340, 343, 354, 355
See application file for complete search history.

(56) References Cited

U.S. PATENT DOCUMENTS

| | | | |
|---|---|---|---|
| 3,938,045 A | 2/1976 | Mathwich | |
| 4,057,759 A | 11/1977 | Genova et al. | |
| 4,516,087 A | 5/1985 | Bruene | |
| 5,157,693 A | 10/1992 | Lemersal, Jr. et al. | |
| 5,177,765 A | 1/1993 | Holland et al. | |
| 5,195,108 A | 3/1993 | Baum et al. | |
| 5,402,450 A | 3/1995 | Lennen | |
| 5,732,106 A | 3/1998 | Rasmussen et al. | |
| 5,818,867 A | 10/1998 | Rasmussen | |

(Continued)

FOREIGN PATENT DOCUMENTS

| WO | WO 92/02082 | 2/1992 |
|---|---|---|
| WO | WO 03/084080 A2 | 10/2003 |

OTHER PUBLICATIONS

International Search Report Application No. PCT/US2006/029141 dated Dec. 15, 2006.
Carl Andren, "Short PN Sequences for Direct Sequences Spread Spectrum Radios", Apr. 11, 1997, pp. 1-4.
John Fakatselis, "Processing Gain for Direct Sequence Spread Spectrum Communication Systems and PRISM®", Intersil Corporation, 2000, pp. 1-4.

(Continued)

*Primary Examiner*—Mohammad H Ghayour
*Assistant Examiner*—Vineeta S Panwalkar
(74) *Attorney, Agent, or Firm*—RatnerPrestia

(57) ABSTRACT

A method of correcting phase error of a phase shift keyed (PSK) signal includes (a) receiving a signal modulated by a spreading sequence; (b) despreading the received signal using a receiver spreading sequence similar to the spreading sequence of step (a); (c) calculating a crosscorrelation profile between the receiver spreading sequence and the received signal; and (d) calculating an autocorrelation profile of the receiver spreading sequence to determine a spreading code property (SCP). The method also includes (e) estimating a timing error in alignment between the autocorrelation and the crosscorrelation profiles; and (f) correcting a phase error of the signal despread in step (c), by using the SCP and the estimated timing error.

22 Claims, 17 Drawing Sheets

U.S. PATENT DOCUMENTS

| | | | |
|---|---|---|---|
| 5,867,525 A | | 2/1999 | Giallorenzi et al. |
| 6,002,710 A | | 12/1999 | Hendrickson et al. |
| 6,108,317 A | * | 8/2000 | Jones et al. ................ 370/320 |
| 6,674,790 B1 | | 1/2004 | Rasmussen et al. |
| 6,859,463 B1 | | 2/2005 | Mayor et al. |
| 2003/0181187 A1 | * | 9/2003 | Liu ............................ 455/302 |

OTHER PUBLICATIONS

Chris Heegard et al., "High-Performance Wireless Ethernet", IEEE, Nov. 2001, pp. 64-73.

* cited by examiner

ENHANCED QPSK OR DQPSK DATA DEMODULATION FOR DIRECT SEQUENCE SPREADING (DSS) SYSTEM WAVEFORMS USING ORTHOGONAL OR NEAR-ORTHOGONAL SPREADING SEQUENCES

CROSS REFERENCE TO RELATED APPLICATIONS

This application claims priority of U.S. Provisional Patent Application Ser. No. 60/703,316, filed Jul. 28, 2005.

STATEMENT REGARDING FEDERALLY SPONSORED RESEARCH

This invention was made with Government Support Under Agreement No. DAAB07-03-9-K601 awarded by the United States Army. The Government has certain rights in the invention.

TECHNICAL FIELD

The present invention relates, in general, to communication systems. More specifically, it relates to enhanced QPSK or DQPSK data demodulation for direct sequence spreading (DSS) system waveforms using orthogonal or near-orthogonal spreading sequences.

BACKGROUND OF THE INVENTION

Quadrature Phase Shift Keying (QPSK) data modulation is used to increase the data rate capability over Binary Phase Shift Keying (BPSK) data modulation. To improve data performance in multi-path channel conditions and to reduce the transmit power spectral density, direct sequence spreading is applied to the data modulation. Differential data detection is performed to simplify the demodulation process, resulting in differential QPSK (DQPSK) reception. The existing 802.11b waveform provides both DBPSK and DQPSK data modulation using a BPSK signal for the direct sequence spreading to provide 1 and 2 Mbps data capability.

To achieve the 1 and 2 Mbps data rates, 11 chips are used to spread the data modulated signal. An 11 chip Barker sequence is used for the spreading sequence. The 11 chip Barker sequence possesses excellent autocorrelation properties, providing a maximum correlation sidelobe level of $1/11$ the peak correlation value. To achieve this excellent correlation property on each data symbol, the same 11 chip Barker sequence is used to spread each data symbol.

As an alternative to using short repeated sequences, BPSK modulation may be used to spread the data. BPSK provides a simple straight forward means to spread either the BPSK or QPSK data. To meet the 802.11 spectral requirements, the BPSK spread signal is passed through a lowpass filter to reduce the power spectrum sidelobe level. The filtered BPSK signal is operated within the linear region of the power amplifier to minimize spectral regrowth output from the RF power amplifier.

There are, however, some limitations to using the aforementioned techniques. First, waveforms using short spreading sequences, such as the 11 chip Barker sequence used for 802.11b waveforms, limit the delay spread range for channel multi-path equalization, because two adjacent symbols can be opposite in polarity. Further, short, repeated, spreading sequences also enable unauthorized listeners to easily recover the data symbol stream. Longer sequences remove these limitations. However, longer spreading sequences do not provide excellent autocorrelation properties across short sections (11 chips for the 802.11b waveforms) of the spreading sequence. Degradation in the autocorrelation property directly degrades the bit-error-rate (BER) system performance.

Second, BPSK spreading waveforms limit power efficiency at the RF power amplifier, because they require the amplifier to operate in a linear mode to prevent spectral sidelobe regrowth. Spreading data using constant envelope modulation signals, like Minimum Shift Keying (MSK) or near constant envelope modulation, like Quasi-bandlimited MSK (QBL-MSK) and Raised Cosine filtered Offset Quadrature Phase Shift Keying (RC-OQPSK), however, enable the RF power amplifier to operate in the nonlinear mode, increasing power efficiency.

Standard parallel demodulation techniques for MSK, QBL-MSK, and RC-OQPSK despread the signal using independent I and Q sequences, and require two orthogonal or near orthogonal spreading sequences. Gold codes are typically used because of their good autocorrelation and cross-correlation properties. However, Gold codes also require, at minimum, 31 chips (lowest length Gold code) of spreading on both the I and Q data, and increasing the number of chips results in a reduced data rate for the same operational chip rate. To reduce the number of spreading chips required for these constant or near constant envelope modulation signals, serial formatting is applied to the spreading waveform. Serial formatting combined with serial demodulation enables these waveforms to be demodulated similarly to BPSK.

For a serial despread MSK, QBL-MSK, or RC-OQPSK signal, the repeating 11 chip Barker sequence can be used for the spreading sequence. Autocorrelation properties for the 11 chip Barker sequence are excellent, providing suppression of the undesired serial demodulation term. To avoid the limitations associated with the short spreading sequence, a longer spreading sequence is used. As described previously, longer spreading sequences do not provide excellent autocorrelation properties across short sections (11 chips for the 802.11b waveforms) of the spreading sequence. The poor autocorrelation properties associated with the long spreading sequence result in the undesired serial demodulation term not being suppressed.

A BER performance curve with a maximum of a quarter chip timing error (sampling at twice the chip rate) for DQPSK data modulations with QBL-MSK spreading for a short 8 chip Neuman-Hoffman sequence (00001101) is shown in FIG. 1. As depicted in FIG. 1, for ideal timing (0 or 0.5 Tc), a $10^{-6}$ BER is achieved at approximately Es/No equal to 11.9 dB, while the maximum Tc/4 timing error condition requires the Es/No to increase to approximately 12.5 dB to provide the same bit error rate.

The BER performance curve with a maximum of a quarter chip timing error (sampling at twice the chip rate) for DQPSK data modulations with QBL-MSK spreading for a long, random spreading sequence is shown in FIG. 2. As depicted in FIG. 2, for ideal timing (0 or 0.5 Tc), a $10^{-6}$ BER is achieved at approximately an Es/No equal to 12.5 dB, while the maximum Tc/4 timing error condition requires the Es/No to increase to approximately 16 dB to provide the same bit error rate. For ideal timing, the additional Es/No required for the long sequence versus the short sequence is only 0.6 dB. For the maximum Tc/4 timing error condition, the additional Es/No required for the long sequence versus the short sequence is 3.5 dB. This significant degradation in BER performance for timing error must be reduced by either increasing the timing resolution or by compensating for the poorer autocorrelation properties of the long spreading sequence over the shorter symbol spreading length. Increasing the timing resolution requires an increase in the sampling rate, which increases the demodulator complexity and DC power consumption.

To minimize demodulator complexity and power consumption, the present invention provides a compensation approach, among other features.

SUMMARY OF THE INVENTION

To meet this and other needs, and in view of its purposes, the present invention provides a method of correcting phase error of a phase shift keyed (PSK) signal, in a receiver. The method includes the steps of (a) receiving a signal modulated by a spreading sequence; (b) despreading the received signal using a receiver spreading sequence similar to the spreading sequence of step (a); (c) calculating a crosscorrelation profile between the receiver spreading sequence and the received signal; (d) calculating an autocorrelation profile of the receiver spreading sequence to determine a spreading code property (SCP); (e) estimating a timing error in alignment between the autocorrelation and the crosscorrelation profiles; and (f) correcting a phase error of the signal despread in step (c), by using the SCP and the estimated timing error.

Another embodiment of the present invention provides a method of serially demodulating a phase shift keyed (PSK) signal, in a receiver. The method includes (a) receiving a PSK signal modulated by a spreading sequence at a chip rate; (b) dividing the PSK signal into an inphase (I) signal and a quadrature (Q) signal at a sampling rate greater than the chip rate; (c) rotating phases of the I signal and the Q signal at the sampling rate of step (b) to obtain serially demodulated I and Q signals; (d) determining chip synchronization time for the serially demodulated I and Q signals; (e) decimating the serially demodulated I and Q signals, based on the determined chip synchronization time, so that the serially demodulated I and Q signals are sampled at the chip rate; and (f) despreading both the decimated I and Q signals by mixing both the decimated I and Q signals with a single spreading sequence.

Yet another embodiment of the invention is a receiver. The receiver includes a despreading module for despreading a baseband signal, using a spreading sequence generated by a code generator, a crosscorrelation module for calculating a crosscorrelation profile between the baseband signal and the spreading sequence, an autocorrelation module for calculating an autocorrelation profile of the spreading sequence to determine a SCP value of the spreading sequence. The receiver also includes a timing error estimating module, coupled to the crosscorrelation and autocorrelation modules, for estimating an alignment error between the autocorrelation profile and the crosscorrelation profile; and a phase correction module, coupled to the timing error estimating module and the despreading module, for correcting a phase error in the despread baseband signal.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

To enable operation of a serial demodulator with long spreading sequences, the serial demodulator spreading operation takes advantage of knowing the long spreading sequence. The spreading properties for the long spreading sequence are determined for each short spreading sequence used to despread the data. By knowing the spreading sequence property for the despread data symbol along with an estimate of the chip timing error from the synchronization correlation function, a proper phase correction is applied to the despread I and Q signals, significantly reducing the undesired serial demodulation term.

Figure 3:
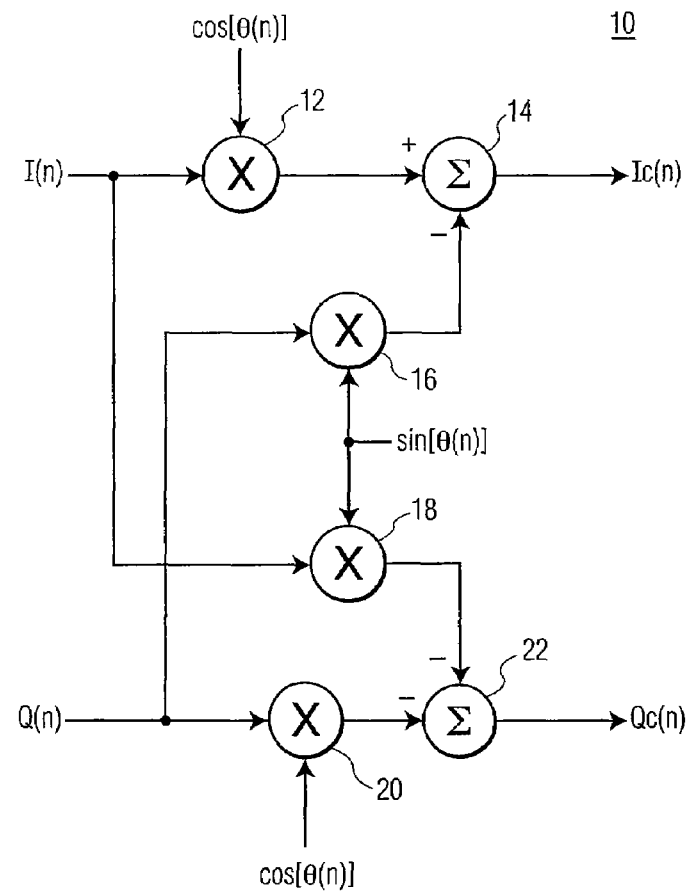
FIG. 3 is a block diagram of a phase correction module, in accordance with an embodiment of the present invention.

FIG. 3 shows phase correction module 10. Module 10 is applied to the despread inphase (I) and quadrature (Q) signals to generate the phase corrected I(Ic) and Q(Qc) signals. As shown in FIG. 3, the despread I and Q signals, I(n) and Q(n), enter phase correction module 10 and are mixed with a $\cos[\theta(n)]$ signal at mixers 12 and 20 and a $\sin[\theta(n)]$ signal at mixers 16 and 18. The outputs from mixers 12 and 16 are then combined at summer 14. Likewise, the outputs from mixers 18 and 20 are combined at summer 22. Phase corrected signals Ic and Qc are then output from summers 14 and 22. The correction phase terms using the cosine and sine signals depend upon the spreading sequence one chip cross-correlation property across the despread symbol.

It will be understood that as used herein, a "summer" includes functions of addition and subtraction.

Figure 1:
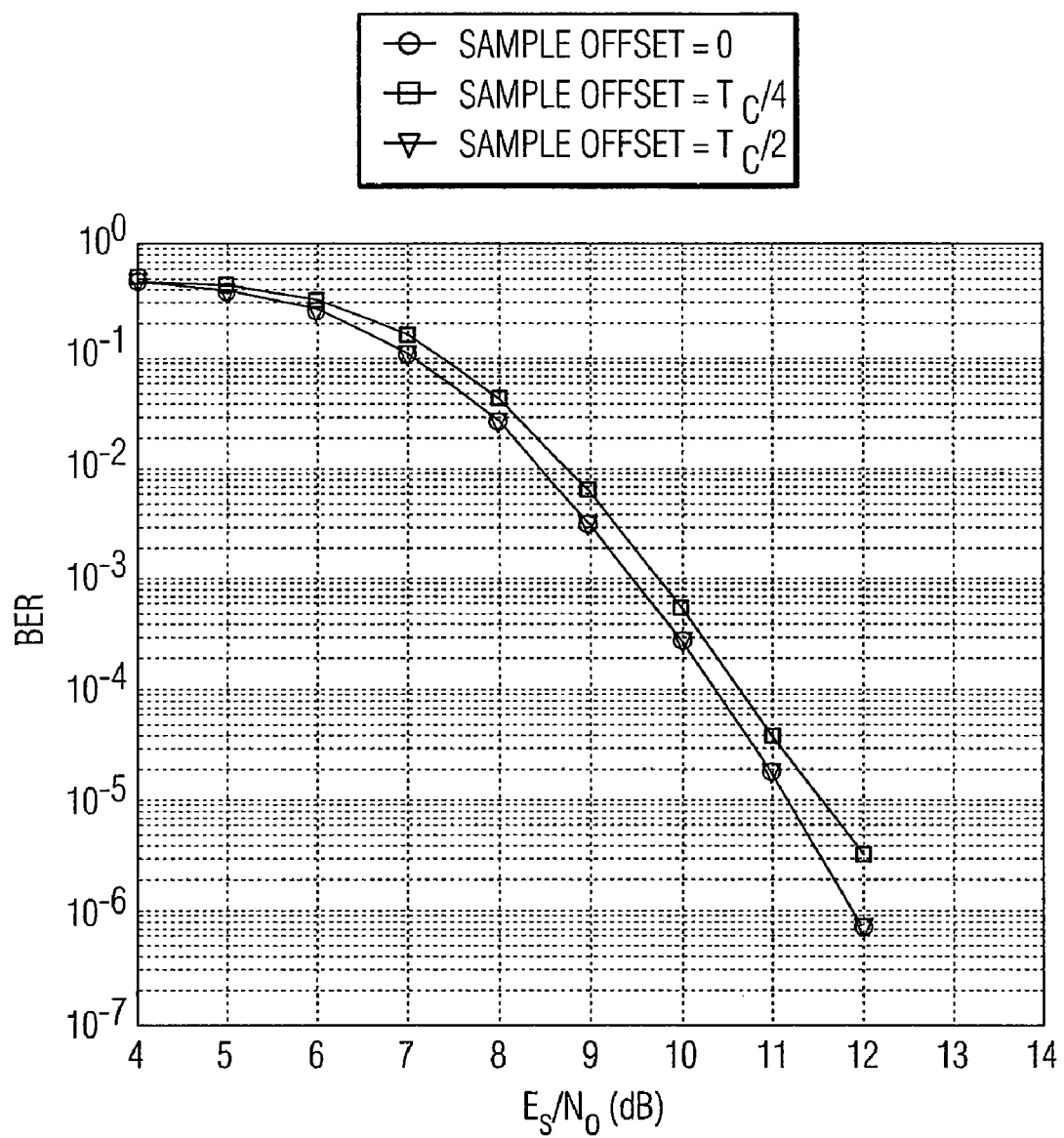
FIG. 1 is a BER performance curve with a maximum of a quarter chip timing error (sampling at twice the chip rate) for DQPSK data modulations with QBL-MSK spreading for a short 8 chip Neuman-Hoffman sequence.
Figure 2:
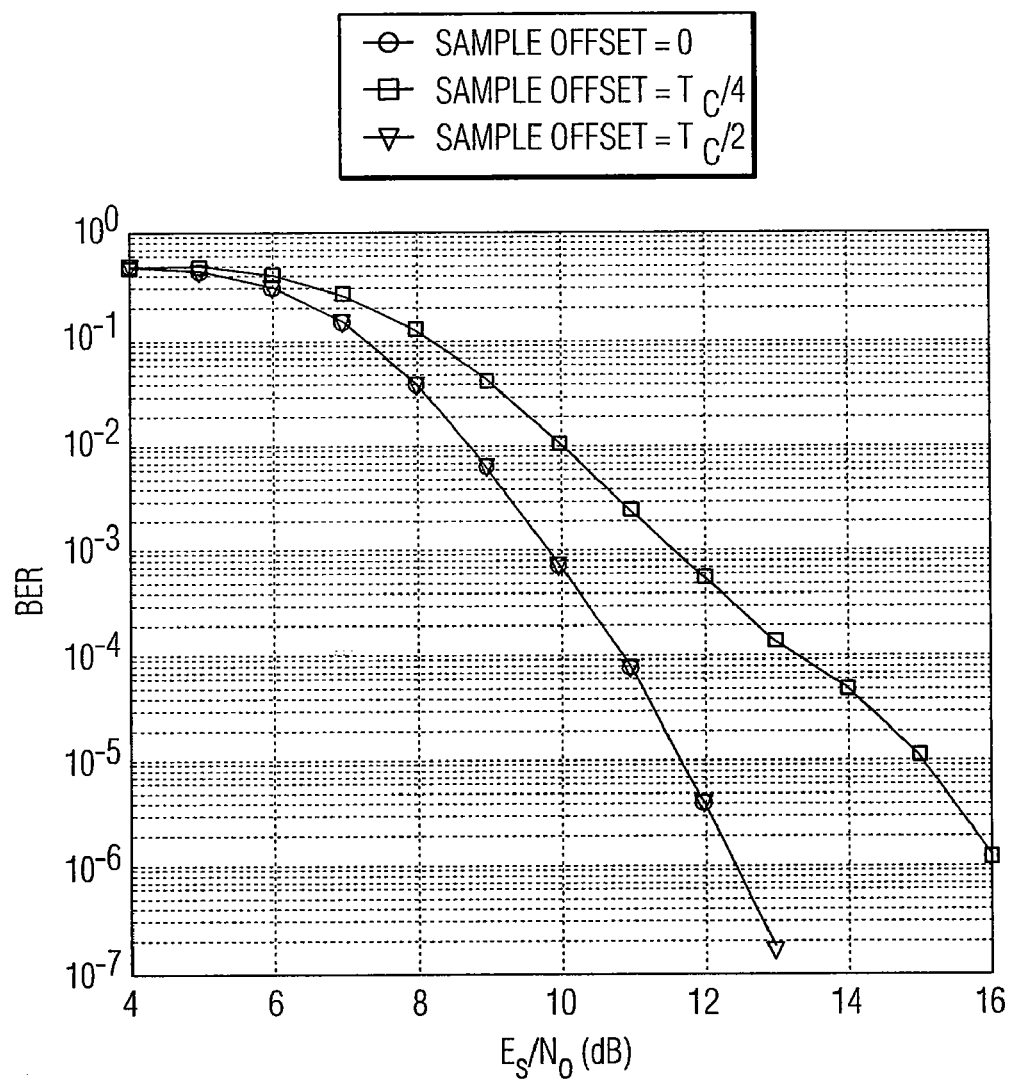
FIG. 2 is a BER performance curve with a maximum of a quarter chip timing error (sampling at twice the chip rate) for DQPSK data modulations with QBL-MSK spreading for a long, random spreading sequence.
Figure 4A:
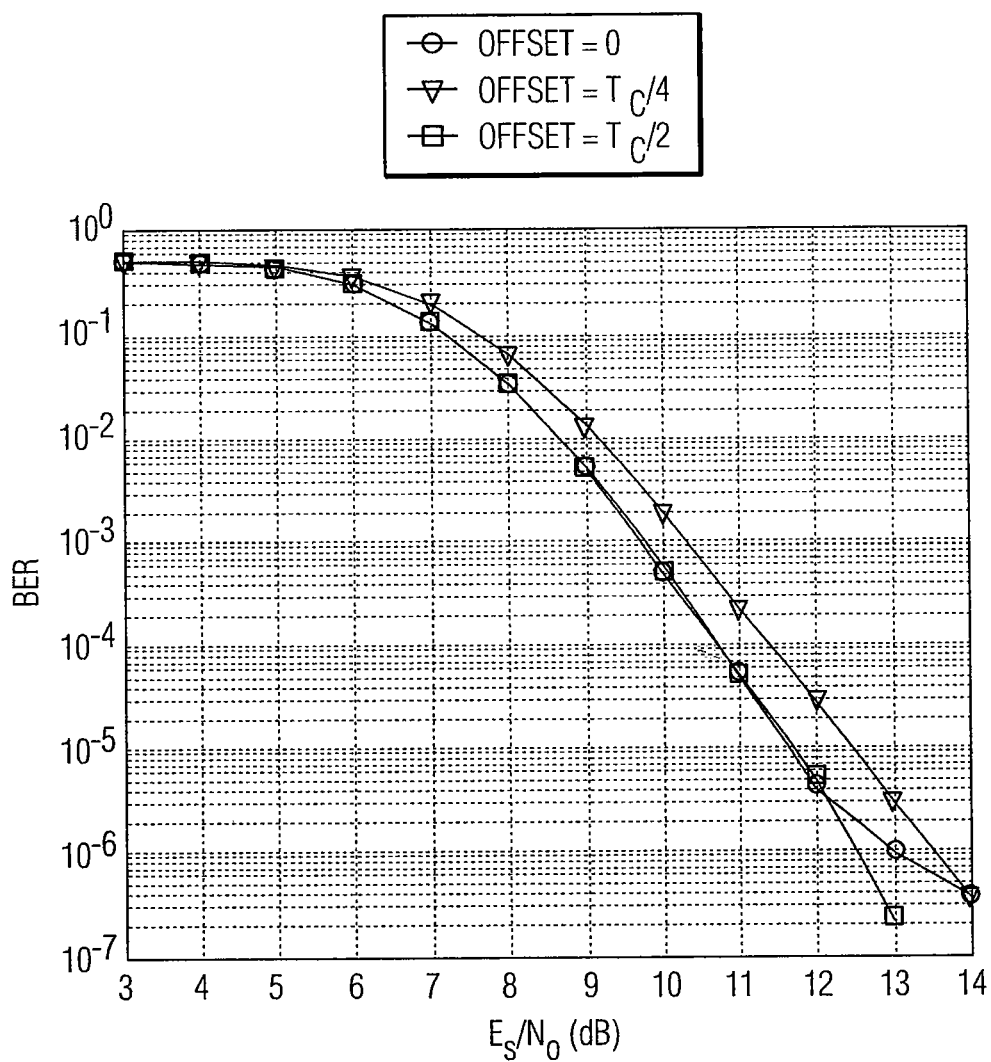
FIGS. 4A and 4B are graphs depicting the improved BER performance for DQPSK data detection using the phase correction module of FIG. 3 versus DQPSK without phase correction.
Figure 4B:
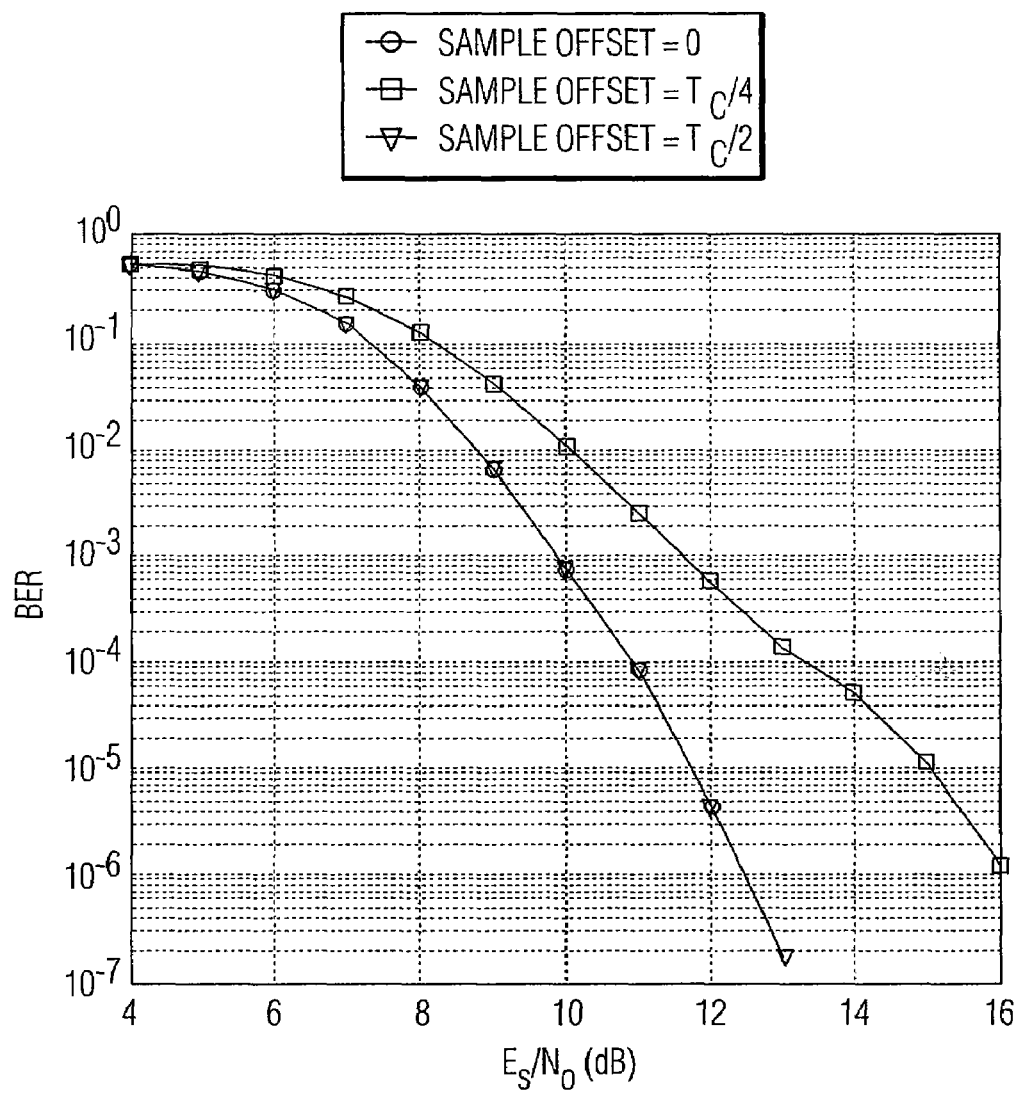

Removing the undesired serial demodulation term results in significant improvement in the bit rate error (BER) performance. FIGS. 4A and 4B show the improved BER performance for DQPSK data detection using the phase correction module versus DQPSK without phase correction. Specifically, FIG. 4A shows DQPSK BER performance with phase correction and FIG. 4B shows DQPSK BER performance without phase correction. The improvement is shown for different chip timing errors. For example, for a Tc/4 timing error, approximately 13.5 dB is required to provide a $10^{-6}$ BER for DQPSK with phase correction, whereas 16 dB is required to provide the same bit error rate without phase correction. This is a 2.5 dB reduction in Es/No. Further, for a Tc/4 timing error, the long sequence with phase correction requires an increase of 1 dB in Es/No as compared to a short sequence for operation at $10^{-6}$ BER (compare FIGS. 4 and 1).

An embodiment of the present invention uses serial QBL-MSK for spreading modulation to provide near constant RF envelope modulation and to enable use of serial despreading. Although QBL-MSK is selected as the spreading waveform for this particular embodiment, other constant or near constant envelope modulations, such as MSK, Gaussian MSK, OQPSK, and RC-OPSK may be used.

Serial despreading, as opposed to parallel despreading, utilizes a simplified BPSK despreading operation and separates despreading into inphase (I) and quadrature (Q) codes. Serial despreading reduces the chip to symbol rate to 8 chips per symbol. Lower spreading ratios, such as 8 chips/symbol, are desirable for obtaining higher data rates when the communications channel can support it. For BPSK or QPSK data modulation on SQBL-MSK, a spread modulation waveform may be written as follows:

$$s(t) = \sum_{k=0}^{N} \left\{ \left[ \sum_{i=0}^{M-1} (-1)^i c_{2i+2kM} \cdot p(t - [2i + 2kM]T_c) \right] \cos(2\pi f_o t + \theta_k) + \left[ \sum_{i=0}^{M-1} (-1)^i c_{2i+2kM+1} \cdot p(t - [2i + 2kM + 1]T_c) \right] \sin(2\pi f_o t + \theta_k) \right\} \quad \text{(eqn 1)}$$

and $$p(t) = \begin{cases} \left[ \dfrac{\sin\left(\dfrac{\pi t}{2T_c}\right)}{\left(\dfrac{\pi t}{2T_c}\right)} \right]^3; & -2T_c \leq t \leq 2T_c \\ 0; & \text{elsewhere.} \end{cases} \quad \text{(eqn 2)}$$

where $T_c$ represents the chip period, $c_i$ represents the chip at time $iT_c$, $2M$ is the number of chips per data symbol in the modulated signal, $p(t)$ is the QBL pulse-shaping function, $f_o$ is the carrier center frequency, and the $(-1)^i$ terms, which multiply the chip value, represent the serial formatting. The chips ($c_i$), which spread the data modulated symbols (BPSK or QPSK), are either +1 or −1.

The data modulation (BPSK or QPSK), represented by the $\theta_k$ carrier phase term, is either 0 or $\pi$ for BPSK data modulation and $-0.5\pi$, 0, $0.5\pi$, or $\pi$ for QPSK data modulation. Applying differential encoding to the BPSK or QPSK data modulation does not impact this equation, only the mapping to the carrier phase term given by the following equation:

$$\theta_k = \sum_{m=0}^{k} \Delta\theta_m; \quad \text{(eqn 3)}$$

where $\Delta\theta$ is the phase change introduced by the differential encoding.

Figure 5A:
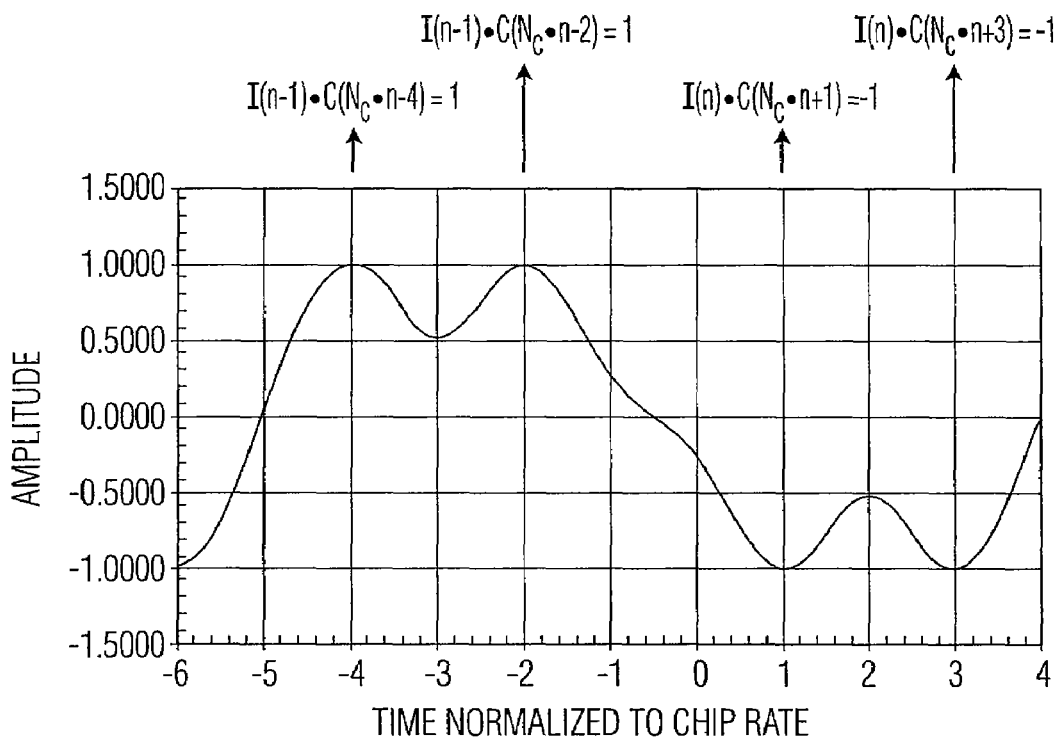
FIGS. 5A, 5B and 5C are graphs illustrating severe envelope distortions occurring when both the I and Q signals go to zero at the same point in time.
Figure 5B:
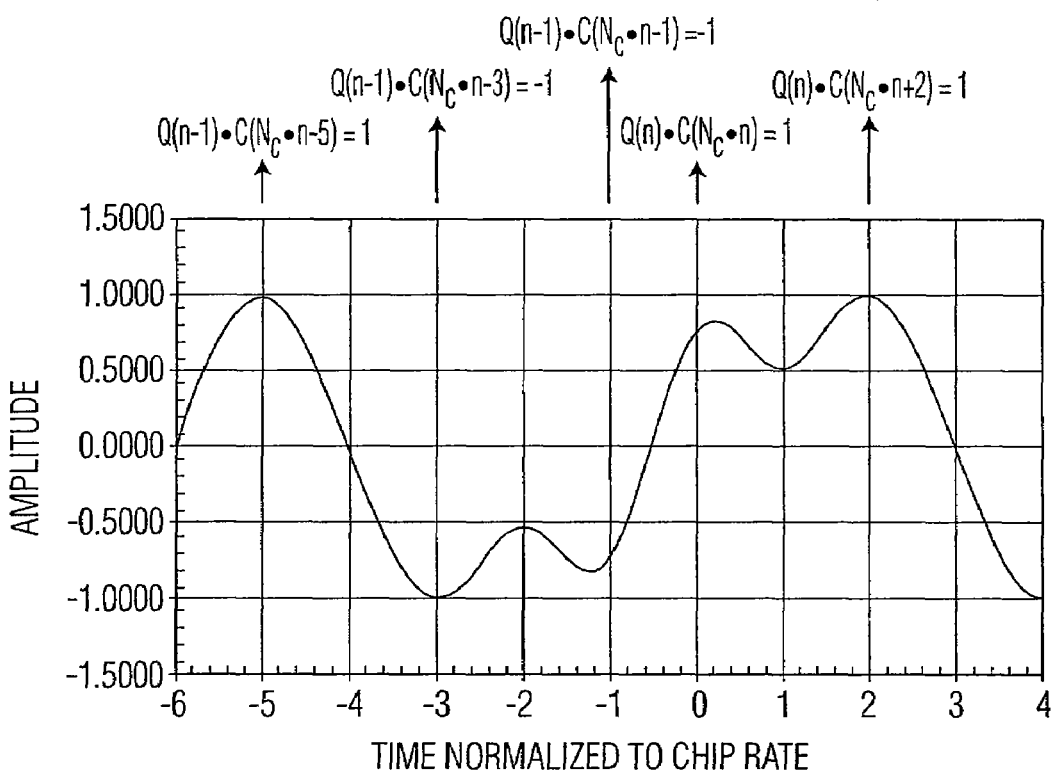
Figure 5C:
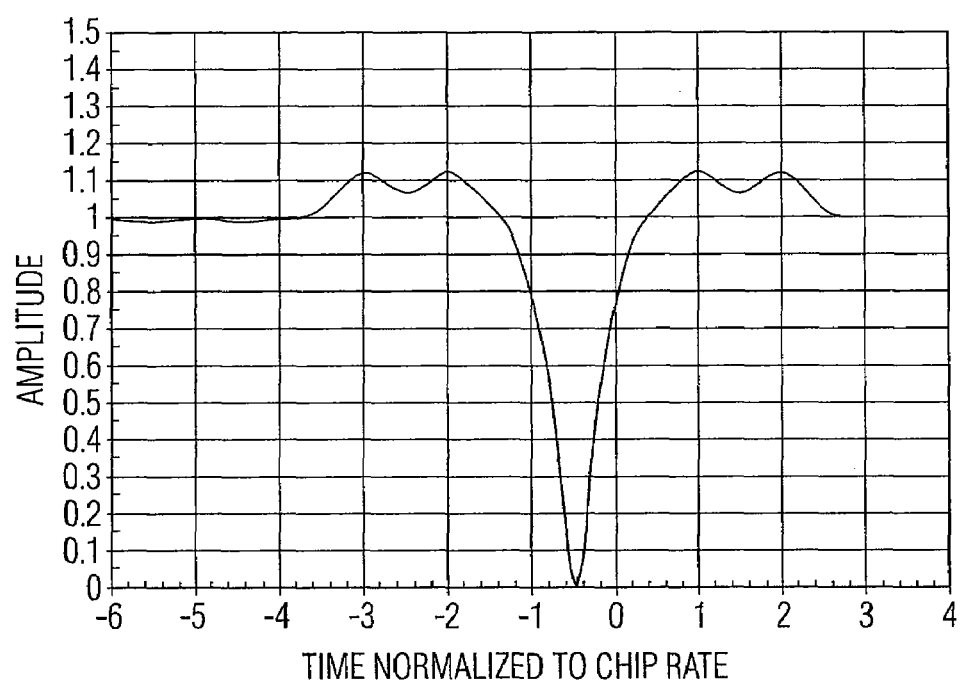
Figure 6A:
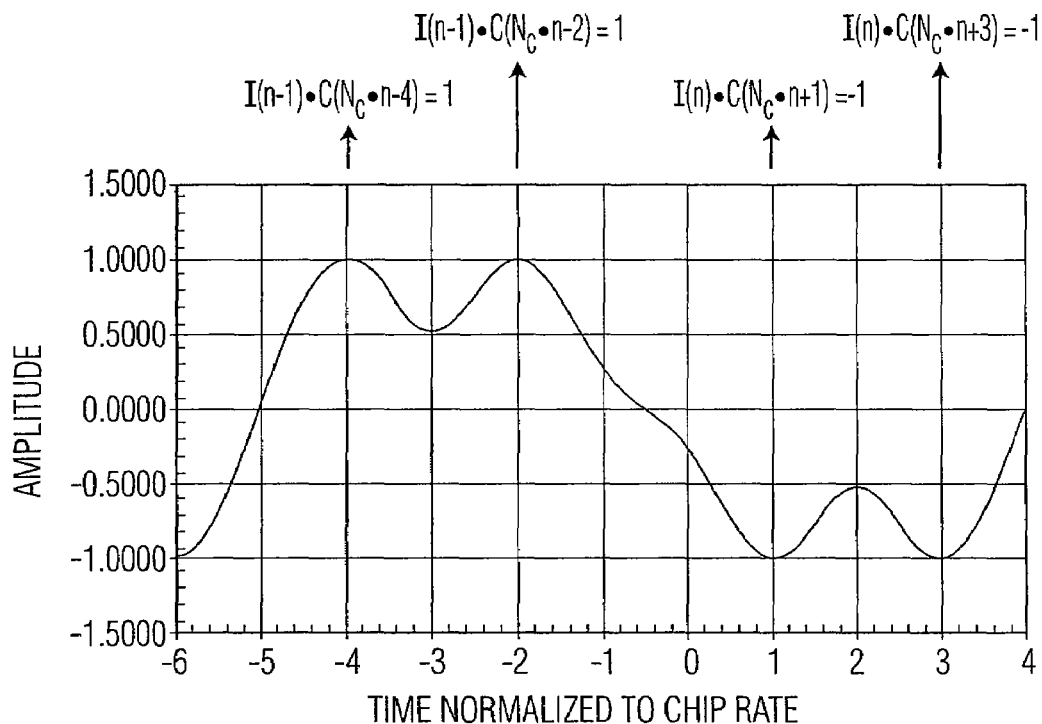
FIGS. 6A, 6B and 6C are graphs illustrating minimal RF envelope deviation occurring when the I and Q signals do not go to zero at the same point in time.
Figure 6B:
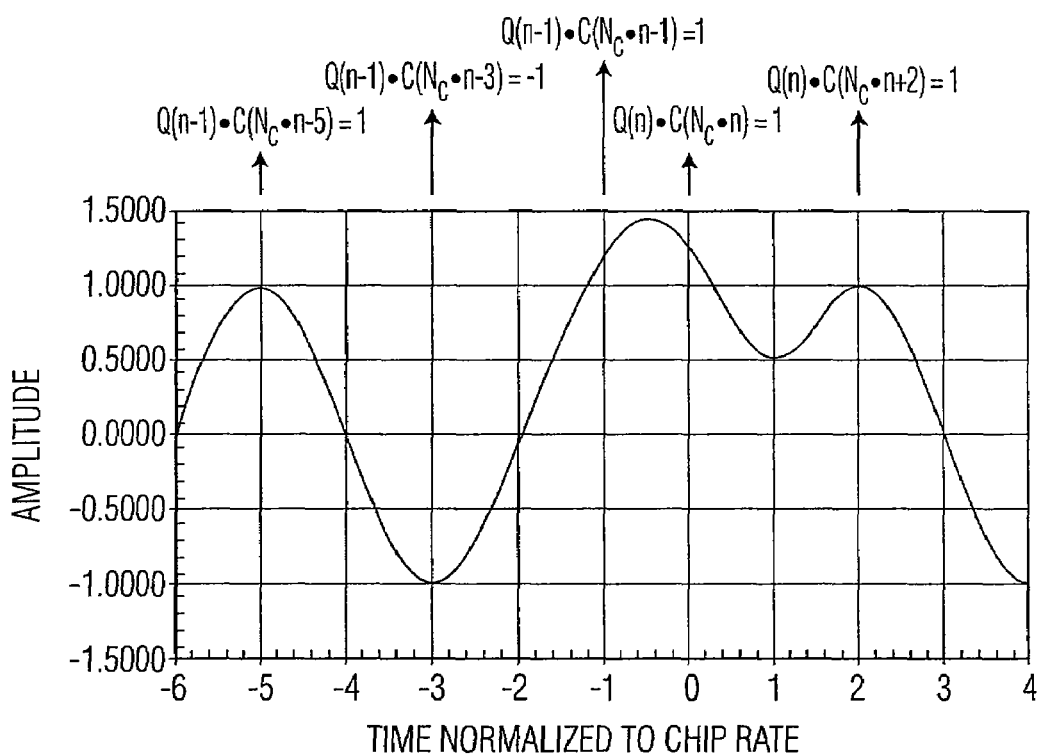
Figure 6C:
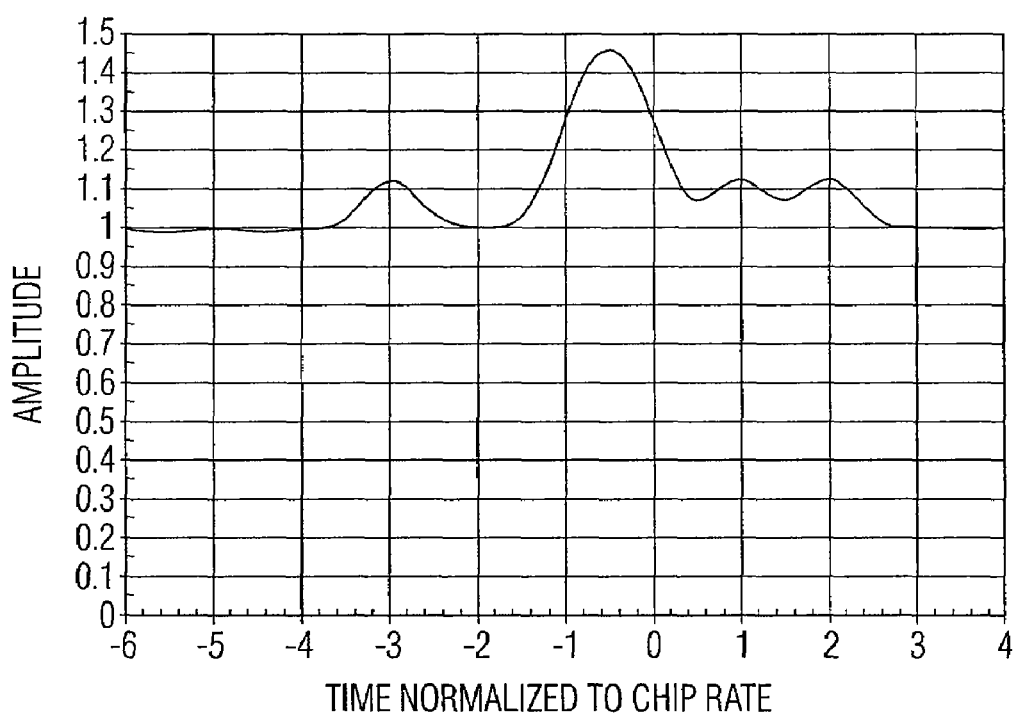

For BPSK data modulation, the SQBL-MSK spreading signal is not impacted by the data modulation. For QPSK data modulation, however, the SQBL-MSK spreading signal is impacted by the data modulation at the symbol boundary conditions when either a $-0.5\pi$ (−90 degree) or $0.5\pi$ (90 degree) phase change between symbols occurs. Two different 90 degree phase change boundaries associated with QPSK data modulation, where the past QPSK symbol is at 0 degrees and the present QPSK symbol is at 90 degrees, may be examined to show two significantly different RF envelope effects. Severe RF envelope distortion is shown in FIGS. 5A-5C. As shown, when both the I and Q signal go to zero at the same point in time, the RF envelope goes to zero. Minimal RF envelope deviation, however, is shown in FIGS. 6A-6C. As shown, the I and Q signals do not go to zero at the same point in time.

As shown in FIGS. 5A-5C, the near constant RF envelope performance of SQBL-MSK is not preserved. To preserve the near constant RF envelope performance of SQBL-MSK, a phase mapping module may be provided in the transmitter. The phase mapping module changes the phase trajectory only about the symbol boundary. Since this change occurs only at the boundary condition, the SQBL-MSK data modulation equation may be used, without phase mapping adjustment, to provide phase correction in the receiver by the phase correction module shown in FIG. 15 (for example).

Figure 7:
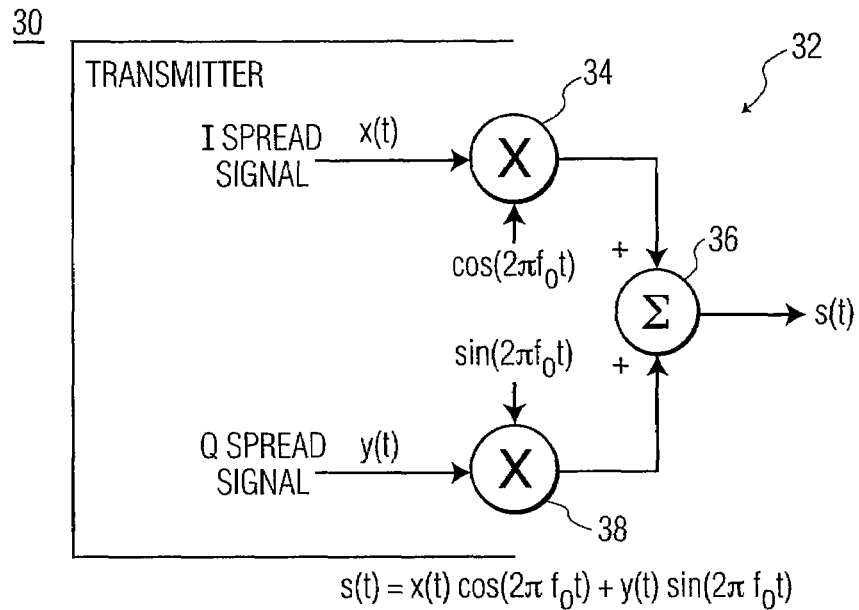
FIG. 7 is a block diagram of an SQBL-MSK module of a transmitter, in accordance with an embodiment of the present invention.

FIG. 7 shows a block diagram for SQBL-MSK modulator 32 of transmitter 30, with I {x(t)} and Q {y(t)} data modulation of BPSK or QPSK with SQBL-MSK spreading on the data symbols. As shown, the I and Q data signals are mixed with a carrier signal at mixers 34 and 38. The outputs from mixers 34 and 38 are then combined by summer 36. The resulting signal is a baseband signal, s(t), represented by the following equation:

$$s(t) = x(t)\cos(2\pi f_o t) + y(t)\sin(2\pi f_o t).$$

Transmitter 30 transmits an RF modulated signal s(t). The RF modulated signal s(t) is then received by receiver 40 shown in FIG. 8.

The equations for the I {x(t)} and Q {y(t)} signals modulating the carrier may be obtained from equation 1 as follows:

$$x(t) = \sum_{k=0}^{N} \left\{ \left[ \sum_{i=0}^{M-1} (-1)^i c_{2i+2kM} \cdot p(t - [2i + 2kM]T_c) \right] \cos(\theta_k) + \left[ \sum_{i=0}^{M-1} (-1)^i c_{2i+2kM+1} \cdot p(t - [2i + 2kM + 1]T_c) \right] \sin(\theta_k) \right\} \quad \text{(eqn 4)}$$

and

-continued $$y(t) = \sum_{k=0}^{N} \left\{ \left[ \sum_{i=0}^{M-1} (-1)^i c_{2i+2kM} \cdot p(t - [2i + 2kM]T_c) \right] \sin(\theta_k) + \left[ \sum_{i=0}^{M-1} (-1)^i c_{2i+2kM+1} \cdot p(t - [2i + 2kM + 1]T_c) \right] \cos(\theta_k) \right\}. \quad \text{(eqn 5)}$$

Since the data symbol phase for QPSK or DQPSK is equal to −90, 0, 90, or 180 degrees over each symbol period, either the even spreading sequence chips are on I with the odd chips on Q (0 and 180 degree symbol conditions) or the odd spreading sequence chips are on I with the even chips on Q (−90 and 90 degree symbol conditions).

Figure 8:
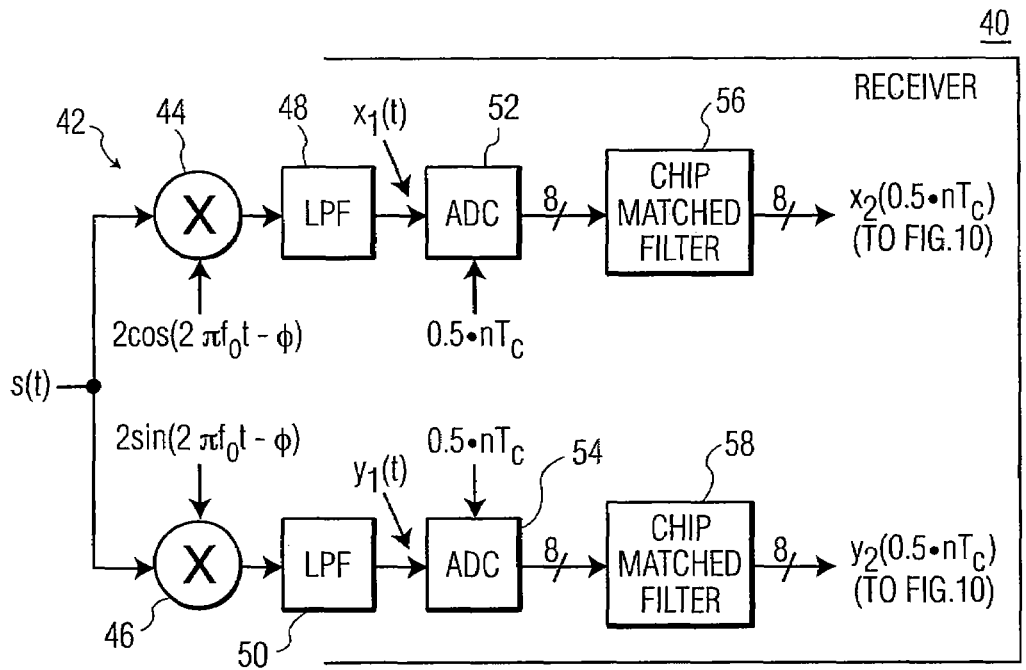
FIG. 8 is a block diagram of an SQBL-MSK demodulator front-end of a receiver, in accordance with an embodiment of the present invention.

FIG. 8 shows a block diagram for SQBL-MSK demodulator 42 of receiver 40. The demodulator front-end down-converts the received signal to baseband I and Q signals, digitizes the I and Q signals, and digitally filters the I and Q signals with chip matched filters. As shown, the received signal is mixed by mixers 44 and 46 with respective quadrature signals at the carrier frequency, resulting in the desired baseband I and Q signals (mixing difference term) and the undesired signal at twice the carrier frequency (mixing sum term). Low-pass filtering by LPF 48 and LPF 50 follows the down-converter function to remove the undesired mixing summation term. Baseband I and Q signals are digitized by the I and Q analog-to-digital converters (ADC), shown as ADC 52 and 54. As shown, the sampling rate of the ADC is equal to twice the chip rate. Following digitization, the I and Q signals are filtered, respectively, by chip matched filters 56 and 58, which maximize the signal-to-noise ratio (SNR). The I and Q chip matched filter outputs are then sent to the despreading operation shown in FIG. 10.

The QBL-MSK chip matched filter coefficients are based on the QBL-MSK pulse-shaping function defined by:

$$p(t) = \begin{cases} \left[ \dfrac{\sin\left(\dfrac{\pi[t - 2T_c]}{2T_c}\right)}{\left(\dfrac{\pi[t - 2T_c]}{2T_c}\right)} \right]^3; & 0 \le t \le 4T_c \\ 0; & \text{elsewhere.} \end{cases} \quad \text{(eqn 6)}$$

where $T_c$ corresponds to the chip or symbol period.

Since the QBL-MSK pulse-shaping function is non-zero over a four chip period interval, the digital QBL-MSK chip matched filter operating at twice the chip rate may include 9 samples, defined by the following equation:

$$p(k) = \left[ \dfrac{\sin\left(\dfrac{\pi[0.5 \cdot k - 2]}{2}\right)}{\left(\dfrac{\pi[0.5 \cdot k - 2]}{2}\right)} \right]^3; \quad k = 0, 1, 2, 3, \ldots, 8. \quad \text{(eqn 7)}$$

Recognizing that the filter value for k equal to 0 and 8 is zero, the digital QBL-MSK chip matched filter response may be simplified to 7 samples, as defined by the following equation:

$$p(k) = \left[ \dfrac{\sin\left(\dfrac{\pi[0.5 \cdot k - 1.5]}{2}\right)}{\left(\dfrac{\pi[0.5 \cdot k - 1.5]}{2}\right)} \right]^3; \quad k = 0, 1, 2, 3, \ldots, 6. \quad \text{(eqn 8)}$$

Figure 9:
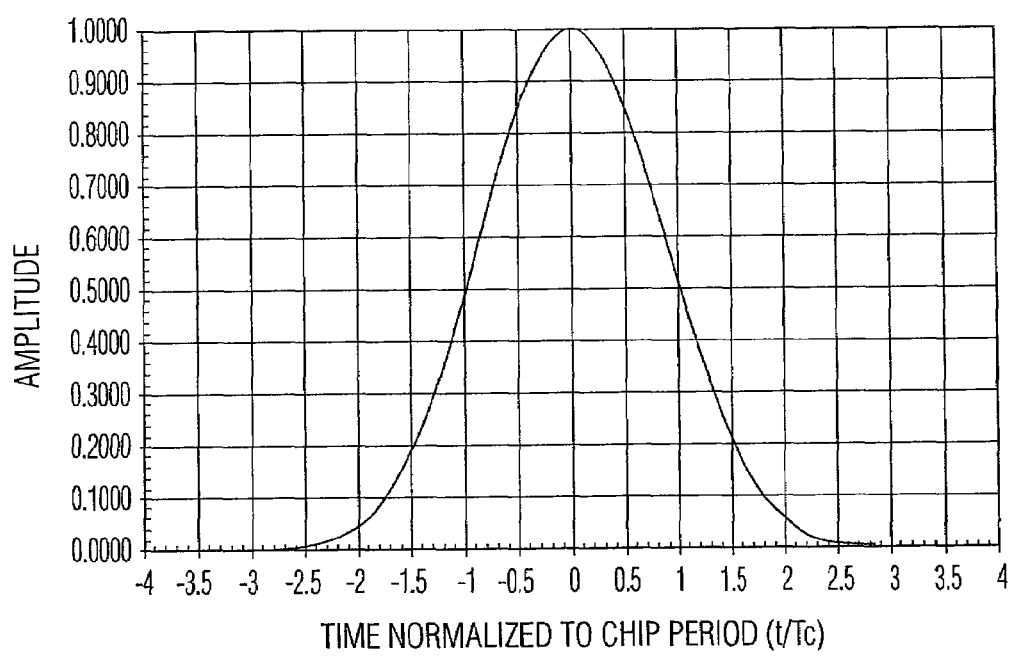
FIG. 9 is a plot of a QBL-MSK autocorrelation function, in accordance with an embodiment of the present invention.

Convolution of the QBL-MSK chip pulse shape with the QBL-MSK chip matched filter results in a QBL-MSK autocorrelation function $\{g(t)\}$. FIG. 9 shows a plot of the QBL-MSK autocorrelation function $\{g(t)\}$. As shown, the autocorrelation function is zero at time $2.5\ T_c$ away from the desired optimum sampling point (time 0).

Using the QBL-MSK autocorrelation function $\{g(t)\}$, the I and Q signals, shown in FIG. 8 as $x_2(0.5 \ast nT_c)$ and $y_2(0.5 \ast nT_c)$, respectively, output from chip matched filters 56 and 58 (based on equations 4 and 5) are as follows:

$$x_2(0.5nT_c) = \sum_{k=0}^{N} \left\{ \left[ \sum_{i=0}^{M-1} (-1)^i c_{2i+2kM} \cdot g(0.5nT_c - [2i + 2kM]T_c) \right] \cos(\theta_k + \phi) + \left[ \sum_{i=0}^{M-1} (-1)^i c_{2i+2kM+1} \cdot g(0.5nT_c - [2i + 2kM + 1]T_c) \right] \sin(\theta_k + \phi) \right\} \quad \text{(eqn 9)}$$

and $$y_2(0.5nT_c) = \sum_{k=0}^{N} \left\{ \left[ \sum_{i=0}^{M-1} (-1)^i c_{2i+2kM} \cdot g(0.5nT_c - [2i + 2kM]T_c) \right] \sin(\theta_k + \phi) + \left[ \sum_{i=0}^{M-1} (-1)^i c_{2i+2kM+1} \cdot g(0.5nT_c - [2i + 2kM + 1]T_c) \right] \cos(\theta_k + \phi) \right\}; \quad \text{(eqn 10)}$$

where $\phi$ is the carrier phase error and $\theta_k$ is the phase introduced by data symbol modulation.

Figure 10:
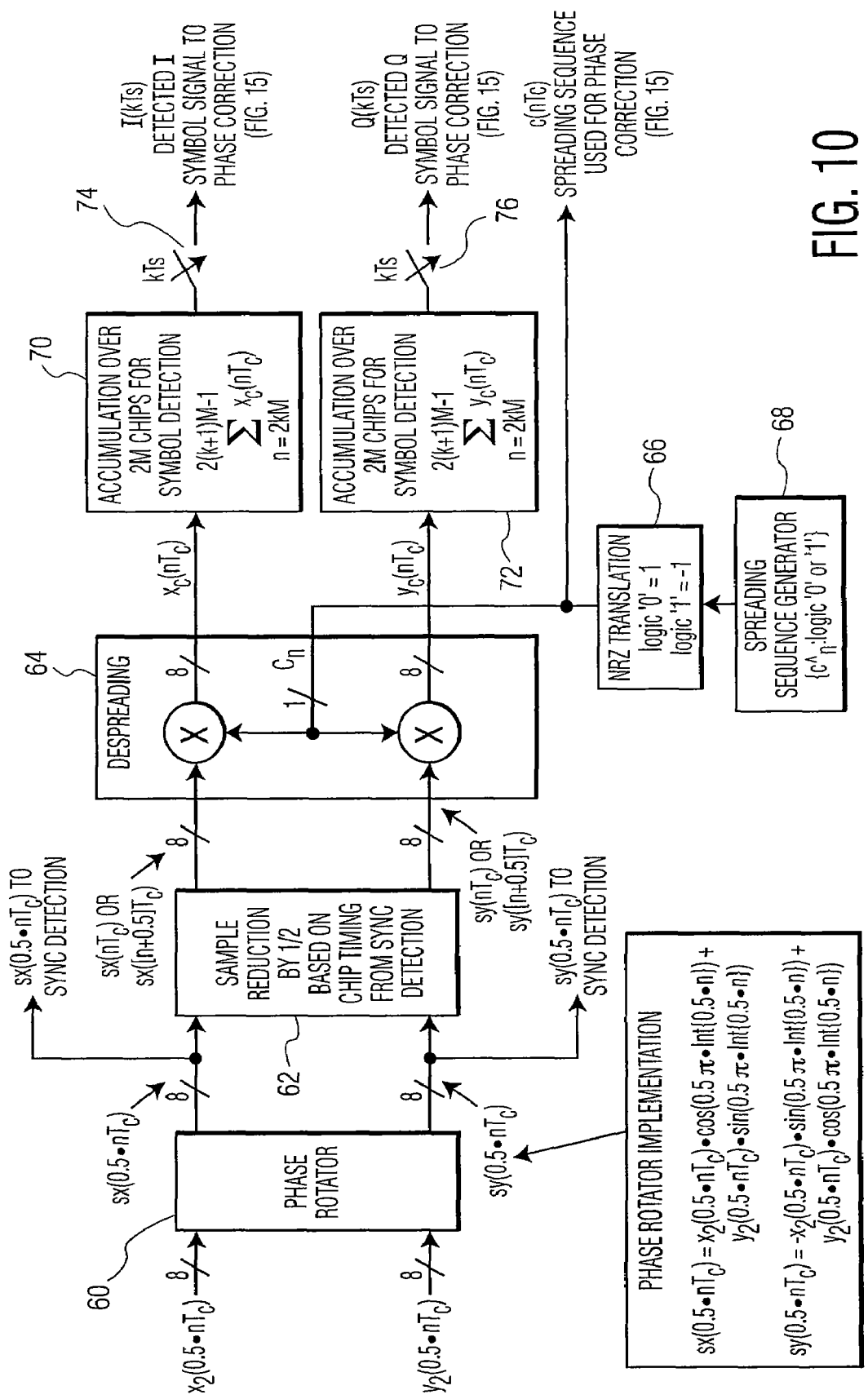
FIG. 10 is a block diagram of an SQBL-MSK despreading operation, in accordance with an embodiment of the present invention.

FIG. 10 shows a block diagram of an SQBL-MSK despreading operation, which performs serial demodulation using phase rotator 60 and despreading of the data symbols via despreader 64. As shown in FIG. 10, the I and Q chip matched filter outputs, shown in FIG. 8, enter phase rotator 60, described in more detail below. Phase rotator 60 enables the SQBL-MSK spread signal to be serially demodulated.

Thus, the present invention enables despreading of both the I and Q signals using the same spreading sequence, eliminating the requirement of separating the spreading sequence into even and odd chips, as required by parallel despreaders. As shown in FIG. 10, despreading module 64 uses the same spreading sequence ($c_n$) to despread both the I and Q signals.

Figure 13:
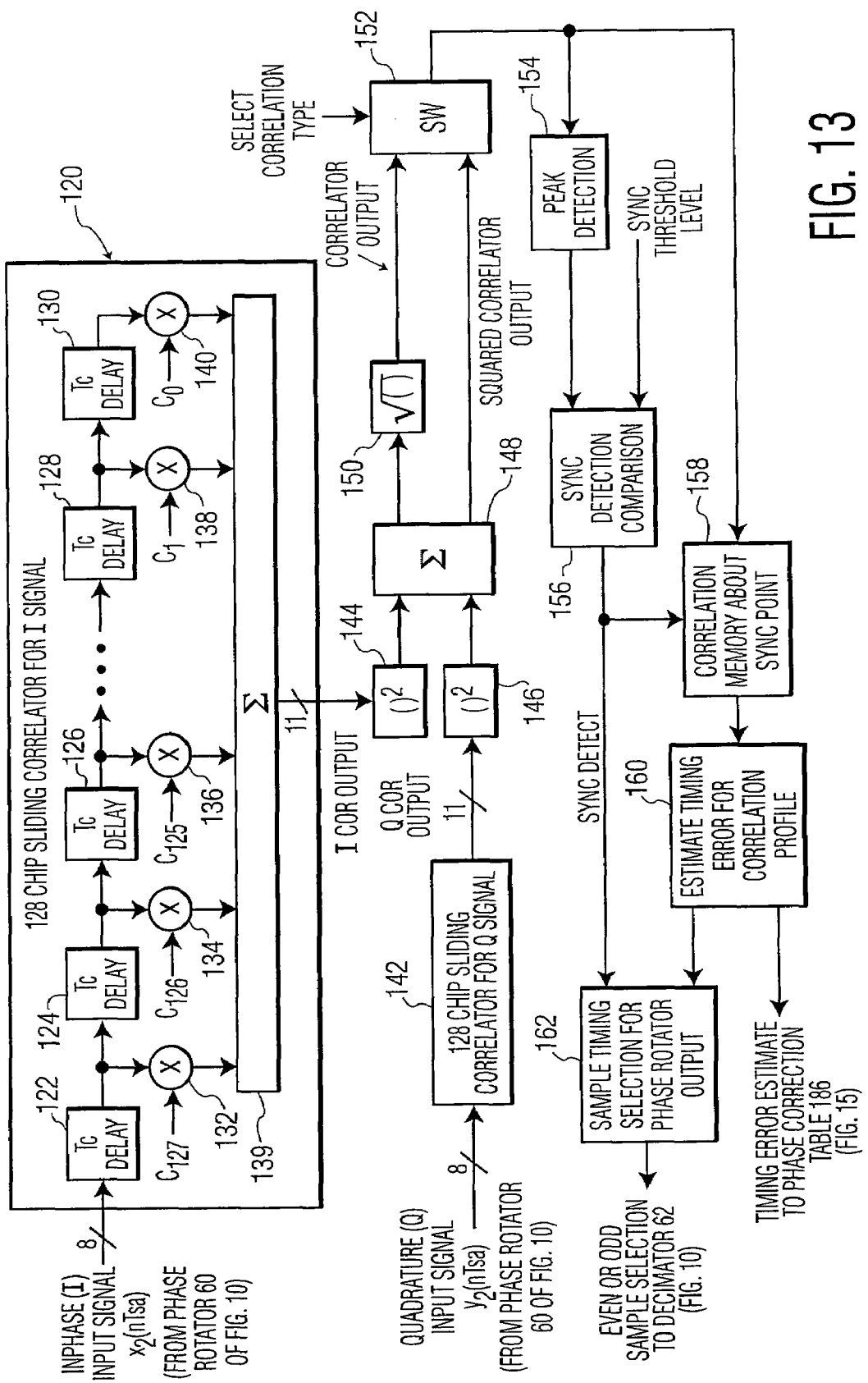
FIG. 13 is a block diagram of a SYNC detection module, in accordance with an embodiment of the present invention.

The two samples per chip I and Q signals output from the phase rotator are sent to the SYNC detection module shown in FIG. 13, which determines the timing control for selecting the proper sample and sent to decimator 62, which reduces the sample rate for the despread operation to the chip rate. Decimator 62 decimates the I and Q signals by 2, providing signals at the chip rate. The signals are then sent to despreader 64, where the I and Q signals are mixed with a single code, $c_n$, from spreading sequence generator 68 (module 66 provides a non-return to zero (NR2) translation of the $c_n$ code).

The despread I and Q signals are then accumulated, over the data symbol period, which may consist of 2M chips per symbol, for example, by accumulators 70 and 72. In this example, with 8 chips per symbol, M is equal to 4, which corresponds to 4 even and 4 odd chips per symbol. Switches 74 and 76 are closed at the symbol rate, $kT_s$, providing the detected I and Q symbol signals. The detected symbols are sent to the phase correction module shown in FIG. 15.

The phase rotator module shown in FIG. 10 may be easily implemented for DQPSK symbol detection. Implementation of the phase rotator is required to allow serial demodulation. A description of phase rotators which may be implemented by the present invention are described by reference to FIGS. 11 and 12.

Figure 11:
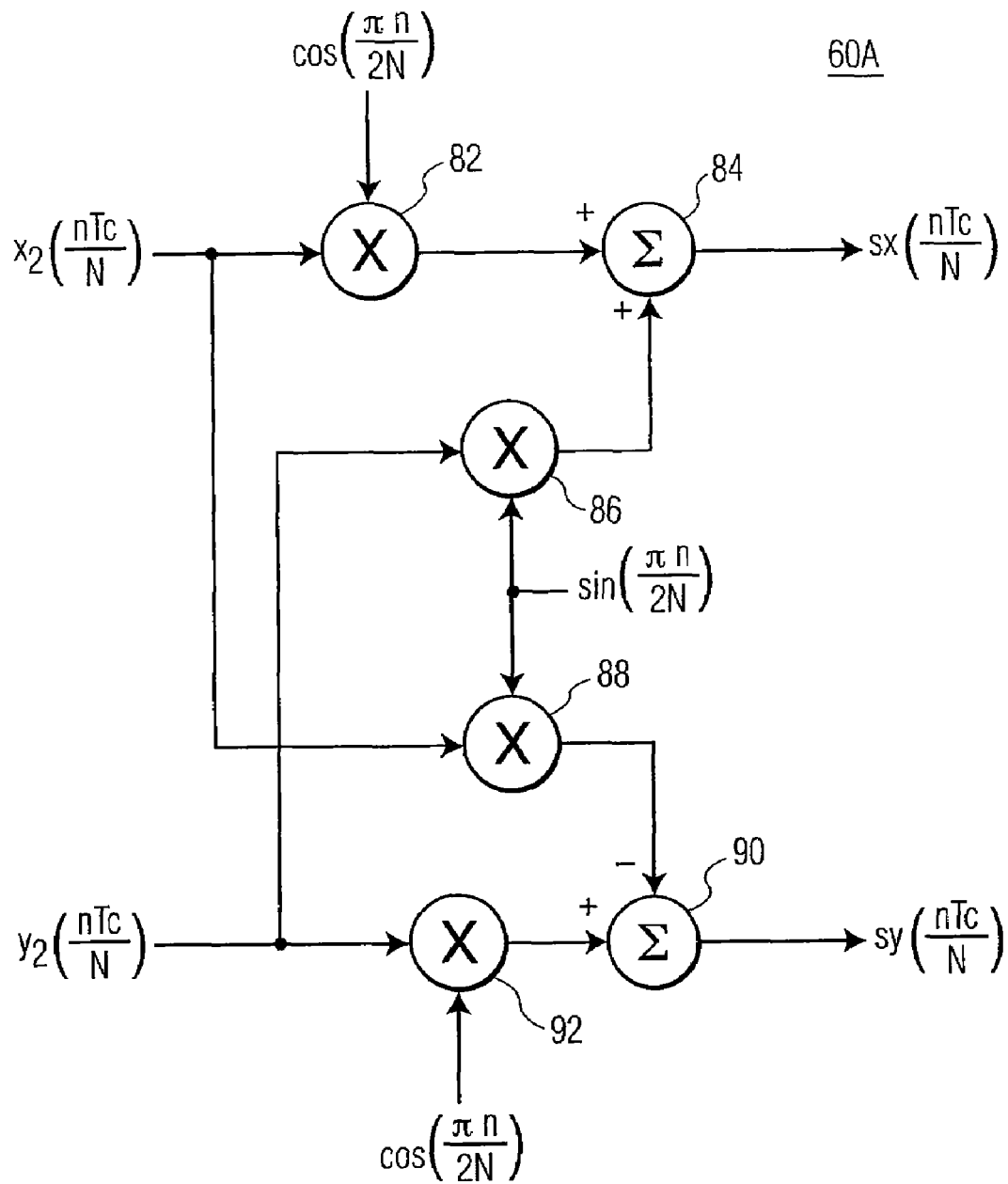
FIG. 11 is a block diagram of a phase rotator, in accordance with an embodiment of the present invention.

FIG. 11 shows phase rotator 60A for serial demodulation about a frequency of one quarter the chip rate below the carrier frequency, represented by $-0.25*R_c$, where $R_c$ represents the chip rate. Sampling at twice the chip rate corresponds to N equal to 2. As shown in FIG. 11, the I and Q chip matched filter outputs of FIG. 8, represented by $x_2(nT_c/N)$ and $y_2(nT_c/N)$, enter the phase rotator to be mixed with a $\cos(\pi n/2N)$ signal at mixers 82 and 92 and a $\sin(\pi n/2N)$ signal at mixers 86 and 88. The outputs from mixers 82 and 86 are combined by summer 84 and the outputs from mixers 88 and 92 are combined by summer 90. The serial I $\{sx(n)\}$ and Q $\{sy(n)\}$ signals output from the phase rotator for N samples per chip, are sent to the SYNC detection module shown in FIG. 13 and the decimator shown in FIG. 10.

The serial I $\{sx(n)\}$ and Q $\{sy(n)\}$ signals output from the phase rotator for N samples per chip are related to the input I $\{x_2(n)\}$ and Q $\{y_2(n)\}$ signals by the following complex equation:

$$sx\left(\frac{nT_c}{N}\right) + jsy\left(\frac{nT_c}{N}\right) = \left[x_2\left(\frac{nT_c}{N}\right) + jy_2\left(\frac{nT_c}{N}\right)\right] \cdot \exp\left(-j2\pi\left[\frac{R_c}{4}\right]\left[\frac{nT_c}{N}\right]\right). \quad (\text{eqn } 11)$$

As shown by this equation, the phase rotator provides a rotating exponential vector at the desired frequency $-0.25*R_c$, represented by the exponential term. Since $R_c \cdot T_c = 1$, the equation for the serial I and Q signal output from the phase rotator may be rewritten, as follows, for N equal to 2:

$$sx(0.5nT_c) + jsy(0.5nT_c) = [x_2(0.5nT_c) + jy_2(0.5nT_c)] \cdot \exp\left(-j\frac{\pi n}{4}\right). \quad (\text{eqn } 12)$$

When the present invention uses a receiver sampling rate equal to twice the chip rate, the rotating vector changes by −45 degrees for each sample. For a receiver with a sampling rate equal to the chip rate, the rotating exponential vector changes by −90 degrees for each sample. For N=1, the phase rotator operation requires only a +1, or −1 multiplication operation on the I and Q input signals, followed by a mapping module to the appropriate I or Q output. This phase rotator structure may easily be implemented in hardware.

The present invention may use a sampling rate that is twice the data rate, corresponding to N=2. For N=2, the phase rotator for even samples is the is same as described for N=1. Odd samples require a 0.7071 or −0.7071 multiplication along with an addition operation, which results in a more complicated phase rotator structure.

Since the serial I and Q signals output from the phase rotator are decimated by 2 before despreading by selecting either the even or odd samples, the same phase rotation may be applied to both the even and odd samples. The present invention simplifies the phase rotator module for N=2 by introducing a phase term, as shown in the following equation:

$$sx(0.5nT_c) + jsy(0.5nT_c) = \\ [x_2(0.5nT_c) + jy_2(0.5nT_c)] \cdot \exp\left(-j\frac{\pi INT\{0.5 \cdot n\}}{2}\right). \quad (\text{eqn } 13)$$

where INT represents a function that takes only the integer value of its argument. Separating the samples into even and odd samples results in the following two equations:

$$sx(nT_c) + jsy(nT_c) = [x_2(nT_c) + jy_2(nT_c)] \cdot \exp\left(-j\frac{\pi n}{2}\right); \quad (\text{eqn } 14)$$

for even samples and $$sx([0.5+n]T_c) + jsy([0.5+n]T_c) = [x_2([0.5+n]T_c) + \\ jy_2([0.5+n]T_c)] \cdot \exp\left(-j\frac{\pi n}{2}\right); \quad (\text{eqn } 15)$$

for odd samples.

Figure 12:
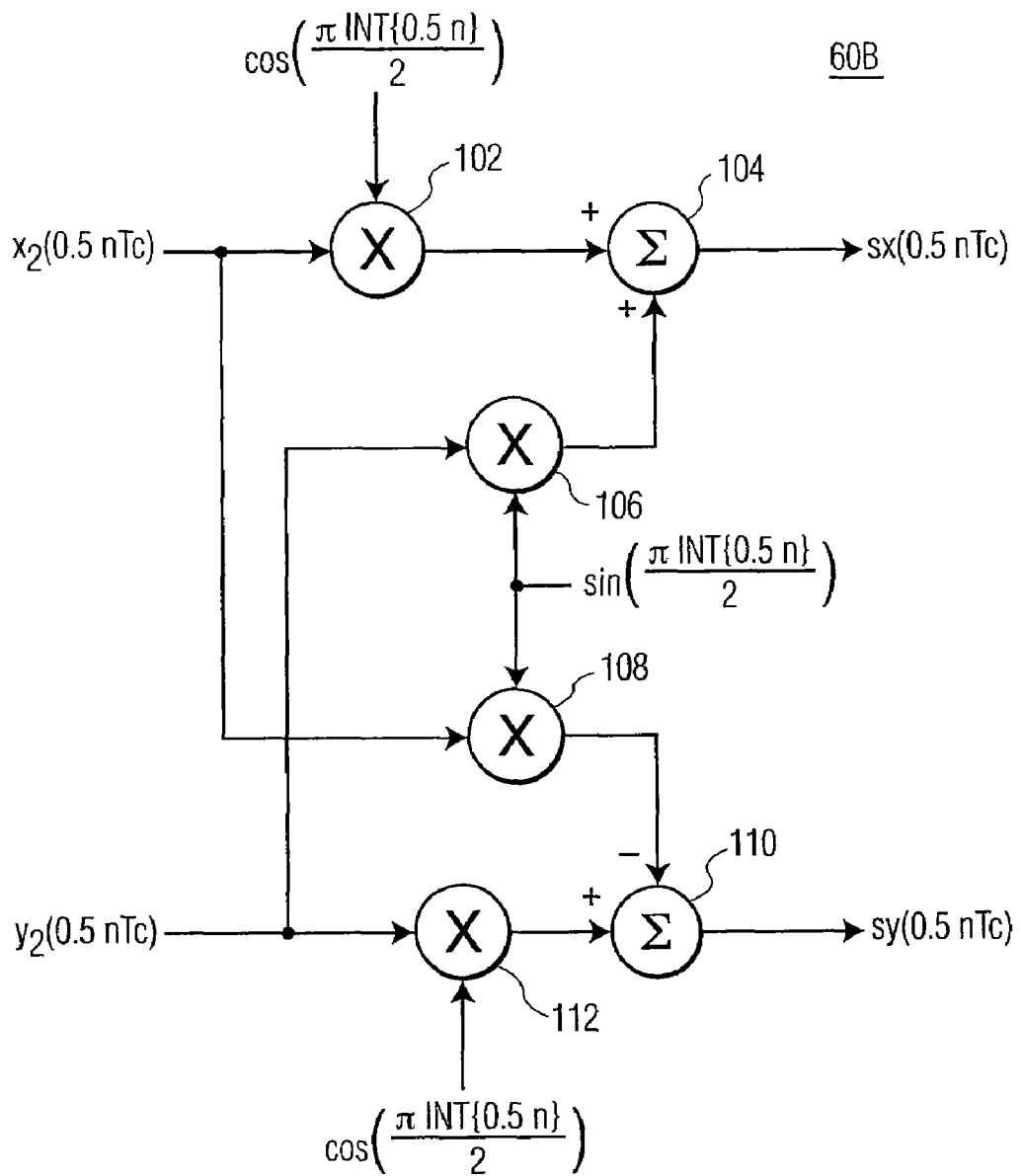
FIG. 12 is a block diagram of a modified phase rotator, in accordance with an embodiment of the present invention.

Comparing the modified phase rotator of equations 14 and 15 to the phase rotator shown in FIG. 11, the even samples output from both rotators are the same. However, the odd samples output from the modified phase rotator are rotated by 45 degrees ($\pi/4$ radians) from the odd samples of the phase rotator of FIG. 11. By adding the phase term, which is zero degrees for even samples and 45 degrees ($\pi/4$ radians) for odd samples, the same simplified phase rotator structure associated with the N=1 phase rotator may be obtained. FIG. 12 shows this modified phase rotator structure.

As shown in FIG. 12, the I and Q chip matched filter outputs of FIG. 8, represented by $x_2(0.5nT_c)$ and $y_2(0.5nT_c)$, enter phase rotator 60B to be mixed with a $\cos(\pi INT\{0.5n\}/2)$ signal at mixers 102 and 112 and a $\sin(\pi INT\{0.5n\}/2)$ signal at mixers 106 and 108. The outputs from mixers 102 and 106 are then sent to summer 104 and the outputs from mixers 108 and 112 are sent to summer 110. The serial I $\{sx(0.5n)\}$ and Q $\{sy(0.5 n)\}$ signals output from phase rotator 60B, represented in FIG. 12 by $sx(0.5nTC)$ and $sy(0.5nTC)$, are sent to the SYNC detection module shown in FIG. 13 and decimator 62 shown in FIG. 10.

The modified phase rotator 60B provides a repetitive mapping structure of 8 samples on both the serial I and Q signals, as shown below:

$$sx(0.5nT_c) = \{x_2(0), x_2(0.5T_c), y_2(T_c), y_2(1.5T_c), -x_2(2T_c), -x_2(2.5T_c), -y_2(3T_c), -y_2(3.5T_c), \ldots\} \quad (\text{eqn } 16)$$

and $$sy(0.5nT_c) = \{y_2(0), y_2(0.5T_c), -x_2(T_c), -x_2(1.5T_c), -y_2(2T_c), -y_2(2.5T_c), x_2(3T_c), x_2(3.5T_c), \ldots\}. \quad (\text{eqn } 17)$$

Following the phase rotator operation is the sample rate reduction by decimator 62 of FIG. 10. The decimation allows for selecting either the odd samples, $[(n+0.5)T_c]$, or even samples $(nT_c)$. The timing is determined by the SYNC detection operation.

The SYNC detection operation used to determine the proper timing will now be described with reference to FIG. 13. The SYNC detection module determines the proper selection of the I and Q samples to the despreading operation and the timing error information for use by the phase correction module shown in FIG. 15. It will be appreciated that in the example of FIG. 13, 128 chips are shown. Other numbers of chips may also be used.

Reduction in the complexity of the SYNC detection I and Q correlators is achieved by decimating the I and Q samples by a factor of 2. Decimation reduces the I and Q sampling rate so that it equals the chip rate. This decimation is achieved by selecting either the even or odd samples to be sent to the SYNC detection.

As shown in FIG. 13, the sample period for the input correlator signal is specified by $T_{sa}$, which is equal to one half the chip period ($T_{sa}=0.5 \bullet T_c$) for operation of the SYNC detection at twice the chip rate. For operation of the SYNC detection module at the chip rate, the sample period equals the chip period ($T_s=T_c$). For operation of the SYNC detection at either the chip rate or twice the chip rate, the delay elements in the correlators 120 and 142 are specified by the chip period ($T_c$). For operating the SYNC detection algorithm at twice the chip rate, the delay element is implemented by two sample period delays ($2 \bullet T_{sa}$). For operating the SYNC detection algorithm at the chip rate, the delay element is implemented by a single sample period delay ($T_{sa}$).

The chip sliding correlators 120 and 142 for the input I and Q signals, as exemplified in FIG. 13, include a sliding length of 128 chips, represented by delay elements 122, 124, 126, 128 and 130 in FIG. 13, which are, respectively, coupled to mixers 132, 134, 136, 138 and 140 for multiplication with respective spreading code signals of $c_{127}$, $c_{126}$, $c_{125}$, ..., $c_0$. The 128 mixed signals are summed by summer 139. This SYNC length is not unique to the present invention and may be made shorter or longer. Also, the full 128 chip correlation does not need to be coherently combined over the full 128 chip sequence. For example, the 128 chip correlation may be coherently combined over 32 chip segments followed by a noncoherent combining of the four 32 chip segments. Neither the SYNC sequence length, nor the correlation structure, is unique to the QPSK/DQPSK phase correction process.

As shown in FIG. 13, the I and Q correlator output signals are, respectively, squared by squaring functions 144 and 146, then combined by summer 148. SYNC detection, it will be understood, may be determined by using either the square of the correlation output or the correlation output (generated by square root module 150). Either correlation output may be used.

Typically, the correlation output is selected by switch 152, because it may be easily implemented with the following approximation:

$$COR(n) = \text{Max}\{MAG[ICOR(n)], MAG[QCOR(n)]\} + \frac{1}{2} \cdot \text{Min}\{MAG[ICOR(n)], MAG[QCOR(n)]\}; \quad \text{(eqn 18)}$$

where Max{ } is the maximum value of its two arguments, Min{ } is the minimum value of its two arguments, and Mag[ ] is the magnitude of its argument.

Figure 14:
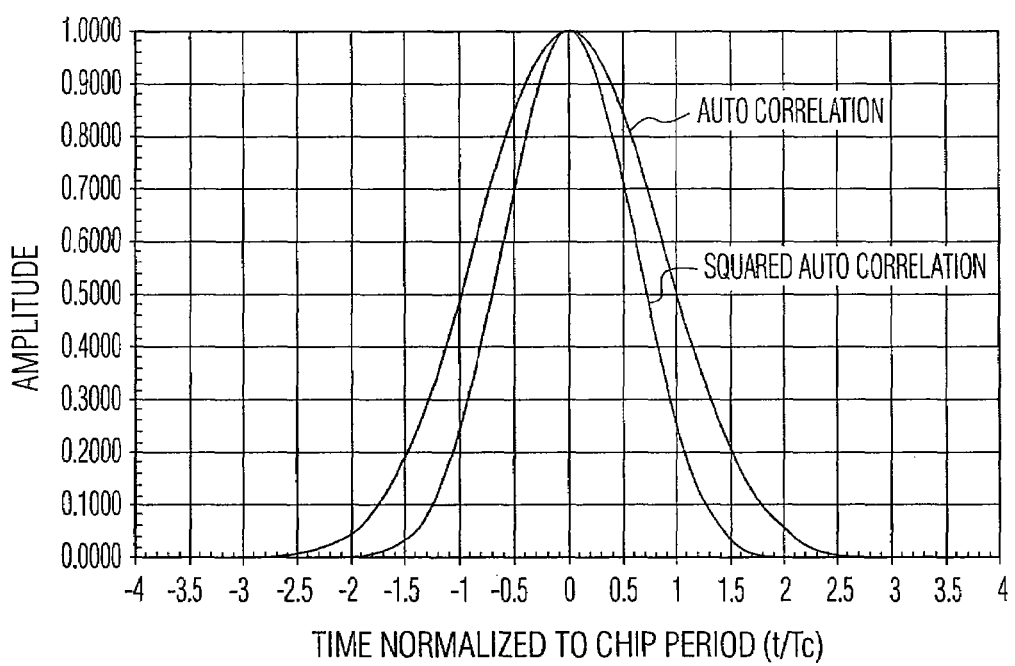
FIG. 14 is a plot of a SYNC correlation curve, for use with the SYNC detection module of FIG. 13.

The signal used as an input signal to peak detection module 154, for each of the two different correlation outputs are shown in FIG. 14. For the square-root output, the correlation signal to the peak detector is the QBL-MSK autocorrelation function, while the squared output is the square of the QBL-MSK autocorrelation function. As may be seen, the correlation response for the squared QBL-MSK autocorrelation function is sharper than the QBL-MSK autocorrelation function, as expected.

Since the correlation response is different depending on the input signal, the time error estimation is also dependent on which input signal is used. By comparing the amplitude of three adjacent samples, peak detection module 154 determines if a peak has occurred at the center sample. If the center sample is declared to be a peak, the magnitude of that sample (peak sample) is compared to the SYNC threshold by SYNC detection comparison module 156. If the magnitude of the peak sample is greater than the SYNC threshold, SYNC is declared by the SYNC detect signal sent to sample timing selection module 162.

SYNC determines the time location of the first chip and whether even or odd samples are processed in the despreader. If the SYNC process is operated at twice the chip rate, a SYNC point within $\pm 0.25 \bullet T_c$ is determined directly by the peak detection. For the SYNC process operating at the chip rate, the SYNC detection point along with the correlation profile is used to establish the SYNC point within a resolution of $\pm 0.25 \bullet T_c$, as described below.

Using the correlation output based on the QBL-MSK autocorrelation response of FIG. 14 and operating the SYNC detection at the chip rate, an exemplary mapping to obtain a finer timing resolution ($\pm 0.25 \bullet T_c$) is outlined below:

(a) select sample $nT_c+0.5T_c$ if $COR(n+1) \geq 2 \bullet COR(n-1)$; +Tc/2 correction implemented (odd sample before the even sample used in the SYNC detection) or (b) select sample $nT_c+0.5T_c$ if $COR(n+1) \geq 2 \cdot COR(n-1)$; +Tc/2 correction implemented (odd sample after the even sample used in the SYNC detection) or (c) select sample $nT_c$; no correction if neither of the two above conditions is met;

where the SYNC I and Q inputs are the even samples only, $COR(nT_c)$ is the peak location, $COR([n+1]T_c)$ is the sample following the peak, and $COR([n-1]T_c)$ is the sample before the peak. In this manner, sample timing selection module 162 chooses the even or the odd samples, based on these three relationships. In is addition, from these three relationships the proper samples output from phase rotator 60 in FIG. 10 may be sent to despreader 64.

The timing error estimate provided by estimate timing error module 160, shown in FIG. 13, will now be described. For phase correction with SYNC operating at a sample rate equal to the chip rate, 7 unique correlation conditions defined by X1, X2, and so on, to X7 are determined from COR(n), COR(n−1), and COR(n+1). Definitions of the seven correlation condition are given below:

$$X1 = \begin{cases} 1; \text{if } COR(n-1) > COR(n+1) \\ 0; \text{if } COR(n-1) \leq COR(n+1) \end{cases}, \quad \text{(eqn 19)}$$

$$X2 = \begin{cases} 1; \text{if } COR(n-1) > 2 \cdot COR(n+1) \\ 0; \text{if } COR(n-1) \leq 2 \cdot COR(n+1) \end{cases}, \quad \text{(eqn 20)}$$

$$X3 = \begin{cases} 1; \text{if } COR(n+1) > 2 \cdot COR(n-1) \\ 0; \text{if } COR(n+1) \leq 2 \cdot COR(n-1) \end{cases}, \quad \text{(eqn 21)}$$

$$X4 = \begin{cases} 1; \text{if } COR(n-1) > 3 \cdot COR(n+1) \\ 0; \text{if } COR(n-1) \leq 3 \cdot COR(n+1) \end{cases}, \quad \text{(eqn 22)}$$

$$X5 = \begin{cases} 1; \text{if } COR(n+1) > 3 \cdot COR(n-1) \\ 0; \text{if } COR(n+1) \leq 3 \cdot COR(n-1) \end{cases}, \quad \text{(eqn 23)}$$

-continued $$X6 = \begin{cases} 1; \text{ if } 1.25 \cdot COR(n+1) < COR(n-1) < 2 \cdot COR(n+1) \\ 0; \text{ otherwise} \end{cases} \quad \text{(eqn 24)}$$

and $$X7 = \begin{cases} 1; \text{ if } 1.25 \cdot COR(n-1) < COR(n+1) < 2 \cdot COR(n-1) \\ 0; \text{ otherwise} \end{cases} \quad \text{(eqn 25)}$$

These seven different correlation conditions are further processed using the following three digital relationships:

$$Y1 = X2 \text{ OR } X3, \quad \text{(eqn 26)}$$

$$Y2 = X4 \text{ OR } X5, \quad \text{(eqn 27)}$$

and $$Y3 = X6 \text{ OR } X7. \quad \text{(eqn 28)}$$

Figure 15:
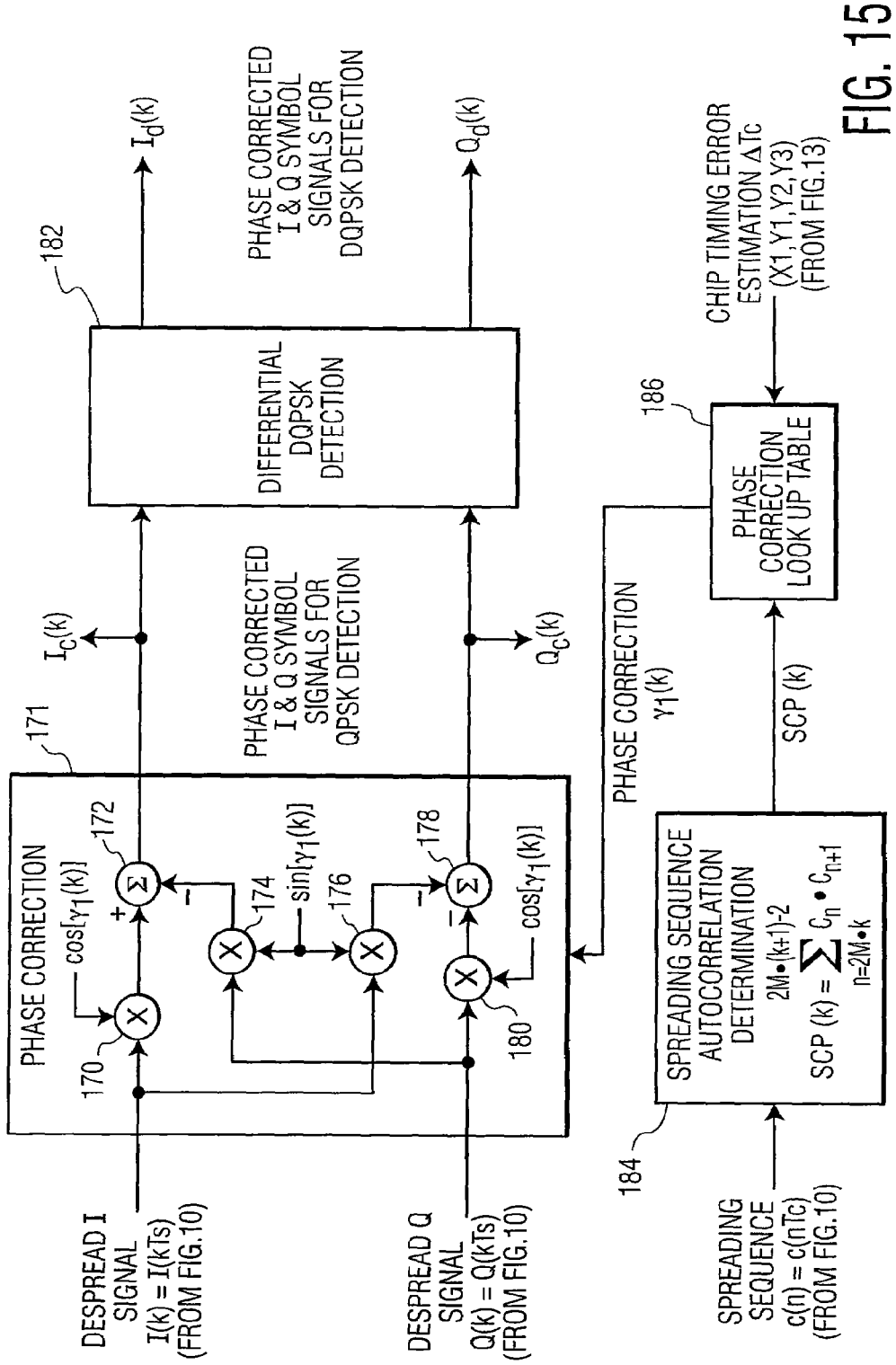
FIG. 15 is a block diagram of a symbol detector with phase correction module, in accordance with an embodiment of the present invention.

The four phase correction parameters X1, Y1, Y2, and Y3 are sent to phase correction table 186, shown in FIG. 15.

It will be understood that SYNC establishes initial timing for the despreading and demodulation processes. To maintain timing throughout the waveform, either chip tracking or serial probes may be used. Chip tracking uses early, late, and on-time despreading to estimate the timing error and perform the proper timing correction. For the chip tracking implementation, information from the early, late, and on-time despreaders may also be used to provide the timing error estimation to the phase correction module.

The serial probe approach is easily implemented, since it is performed in the same manner as SYNC detection process shown in FIG. 13. A known sequence is used for the serial probe, just like with SYNC detection. The serial probe is inserted into the waveform and used to provide an update on the chip timing and the timing error estimation for the phase correction module. The advantage of the SYNC detection and serial probe approach is that a known sequence may be used to determine tap positions for RAKE detection in order to enhance performance in a multi-path channel.

During SYNC detection, a correlation profile based on peak correlation levels are determined about the SYNC point established by correlation memory module 158. The time interval over which this profile is generated is referred to as the multi-path window. Based on magnitude peak level of the correlation profile, multi-path RAKE taps are selected with chip timing and timing error estimation for the phase correction module for each tap.

Returning now to FIG. 10, despreading of the I and Q symbols is done at the chip rate and timing set by the SYNC detection and serial probe, assuming the serial probe is used for maintaining chip timing. As shown in FIG. 10, the same spreading sequence ($c_n$) is used to despread the I and Q signals. The despread I and Q signal are accumulated over the data symbol period, which includes 2M chips per symbol, as an example. For a RAKE implementation, chip timing at decimator 62, despreading at despreader 64, and accumulation at accumulation modules 70 and 72, shown in FIG. 10, may be implemented individually for each RAKE tap based on independent chip timing. Similarly, the spreading code alignment may be based on RAKE tap calculation in a SYNC/serial probe function. Each rake tap, it will be appreciated, generates a detected I and Q symbol signal output.

A general description of the phase error correction process, implemented by the present invention, will now be described.

The serial I and Q outputs from phase rotator 60 and decimator 62 may be rewritten as follows:

$$sx(nT_c) = x_2(nT_c + \Delta T_c) \cdot \cos\left(\frac{\pi n}{2}\right) + y_2(nT_c + \Delta T_c) \cdot \sin\left(\frac{\pi n}{2}\right) \quad \text{(eqn 29)}$$

and $$sy(nT_c) = -x_2(nT_c + \Delta T_c) \cdot \sin\left(\frac{\pi n}{2}\right) + y_2(nT_c + \Delta T_c) \cdot \cos\left(\frac{\pi n}{2}\right); \quad \text{(eqn 30)}$$

where $\Delta T_c$ is the timing error ($\pm T_c/4$ maximum) not removed by the SYNC timing correction when, selecting the even or odd samples, based on timing selection module 162 of FIG. 13. Inserting the equations for $x_2(nT_c)$ and $y_2(nT_c)$ and applying simplifications to these equations provides the following expressions:

$$sx(nT_c) = \sum_{k=0}^{N} \left\{ \left[ \sum_{i=0}^{2M-1} c_{i+2kM} \cdot g([nT_c + \Delta T_c] - [i + 2kM]T_c) \cdot \cos\left(\frac{\pi[nT_c - [i+2kM]T_c]}{2T_c}\right) \right] \cos(\theta_k + \phi) - \left[ \sum_{i=0}^{M-1} c_{i+2kM} \cdot g([nT_c + \Delta T_c] - [i + 2kM]T_c) \cdot \sin\left(\frac{\pi[nT_c - [i+2kM]T_c]}{2T_c}\right) \right] \sin(\theta_k + \phi) \right\} \quad \text{(eqn 31)}$$

and $$sy(nT_c) = -\sum_{k=0}^{N} \left\{ \left[ \sum_{i=0}^{2M-1} c_{i+2kM} \cdot g([nT_c + \Delta T_c] - [i + 2kM]T_c) \cdot \cos\left(\frac{\pi[nT_c - [i+2kM]T_c]}{2T_c}\right) \right] \sin(\theta_k + \phi) + \left[ \sum_{i=0}^{M-1} c_{i+2kM} \cdot g([nT_c + \Delta T_c] - [i + 2kM]T_c) \cdot \sin\left(\frac{\pi[nT_c - [i+2kM]T_c]}{2T_c}\right) \right] \cos(\theta_k + \phi) \right\}. \quad \text{(eqn 32)}$$

From these expressions, two key features of serial demodulation may be seen. First, the serial formatting factor $(-1)^i$ shown in the modulation equation (eqn 1) is removed. Second, the I and Q baseband signals consist of the filtered spreading sequence multiplied by either a cosine or sine weighting function. For coherent detection, the cosine weighted filtered spreading sequence is the desired term on both the I and Q signals.

The QBL-MSK autocorrelation function is nonzero for $\pm 2.5 T_c$ about the ideal SYNC time of zero (see FIG. 9). Since the cosine weighting function forces the QBL-MSK autocorrelation function to zero at times $-T_c+\Delta T_c$ and $T_c+\Delta T_c$, only the QBL-MSK terms at $-2T_c+\Delta T_c$, $\Delta T_c$, and $2T_c+\Delta T_c$ are considered for each cosine weighted QBL-MSK autocorrelation chip response.

Similarly, the sine weighting function forces the QBL-MSK autocorrelation function to zero at times $-T_c+\Delta T_c$, $\Delta T_c$, and $2T_c+\Delta T_c$, so only the QBL-MSK terms at $-T_c+\Delta T_c$ and $T_c+\Delta T_c$ are considered for each sine-weighted QBL-MSK autocorrelation chip response. Using this information, the equations for the serial I and Q signal may be rewritten as follows:

$$sx(nT_c) = \quad \text{(eqn 33)}$$

$$\sum_{k=0}^{N}\left\{\left[\sum_{i=0}^{2M-1} c_{i+2kM} \cdot \{g(\Delta T_c)\delta(n-[i+2kM]) - g(-2T_c + \Delta T_c)\right.\right.$$

$$\delta(n+2-[i+2kM]) -$$

$$g(2T_c+\Delta T_c)\delta(n-2-[i+2kM])\}\bigg] \cdot$$

$$\cos(\theta_k + \phi) - \left[\sum_{i=0}^{M-1} c_{i+2kM} \cdot\right.$$

$$\{-g(-T_c+\Delta T_c)\delta(n+1-[i+2kM]) +$$

$$\left.\left.g(T_c+\Delta T_c)\delta(n-1-[i+2kM])\}\right] \cdot \sin(\theta_k+\phi)\right\}$$

and $$sy(nT_c) = \quad \text{(eqn 34)}$$

$$-\sum_{k=0}^{N}\left\{\left[\sum_{i=0}^{2M-1} c_{i+2kM} \cdot \{g(\Delta T_c)\delta(n-[i+2kM]) - g(-2T_c +\right.\right.$$

$$\Delta T_c)\delta(n+2-[i+2kM]) -$$

$$g(2T_c+\Delta T_c)\delta(n-2-[i+2kM])\}\bigg] \cdot$$

$$\sin(\theta_k+\phi) + \left[\sum_{i=0}^{M-1} c_{i+2kM} \cdot \{-g(-T_c+\Delta T_c)\right.$$

$$\delta(n+1-[i+2kM]) + g(T_c+\Delta T_c)$$

$$\left.\left.\delta(n-1-[i+2kM])\}\right] \cdot \cos(\theta_k+\phi)\right\}$$

where $\delta(n)$ is the unit impulse function, which is equal to 1 for n equal to zero and equal to 0 for all other values of n. Despreading the serial I and Q signals and accumulating over a symbol, results in the following equation for the despread I and Q symbol signals:

$$I(kT_s) = \quad \text{(eqn 35)}$$

$$\sum_{k=0}^{N}\left\{\cos(\theta_k+\phi)\left[2M \cdot \alpha_0 - \sum_{i=2}^{2M-3} c_{i+2kM} \cdot \{c_{i-2+2kM} \cdot \alpha_{-2} +\right.\right.$$

$$\left.c_{i+2+2kM} \cdot \alpha_2\}\right] - \left[\sum_{i=0}^{1} c_{i+2kM}\cdot\right.$$

$$\{c_{i-2+2kM}\cdot\alpha_{-2}\cos(\theta_{k-1}+\phi) + c_{i+2+2kM}\cdot\alpha_2$$

$$\cos(\theta_k+\phi)\} - \left[\sum_{i=2M-2}^{2M-1} c_{i+2kM}\cdot\{c_{i-2+2kM}\cdot\alpha_{-2}\right.$$

$$\left.\cos(\theta_k+\phi) + c_{i+2+2kM}\cdot\alpha_2\cos(\theta_{k+1}+\phi)\}\right] -$$

$$\sin(\theta_k+\theta_0)\left[\sum_{i=1}^{2M-2} c_{i+2kM}\cdot\{c_{i-1+2kM}\cdot\alpha_{-1} - c_{i+1+2kM}\cdot\alpha_1\}\right] +$$

$$c_{2kM}\cdot[c_{2kM-1}\cdot\alpha_{-1}\cos(\theta_{k-1}+\phi) -$$

$$\left.c_{2kM+1}\cdot\alpha_1\cos(\theta_{k+1}+\phi)]\right\}$$

and

-continued $$Q(kT_s) = -\sum_{k=0}^{N}\left\{\sin(\theta_k+\phi)\left[2M\cdot\alpha_0 - \sum_{i=2}^{2M-3} c_{i+2kM}\cdot\right.\right. \quad \text{(eqn 36)}$$

$$\{c_{i-2+2kM}\cdot\alpha_{-2} + c_{i+2+2kM}\cdot\alpha_2\}\bigg] - \left[\sum_{i=0}^{1} c_{i+2kM}\cdot\right.$$

$$\{c_{i-2+2kM}\cdot\alpha_{-2}\cos(\theta_{k-1}+\phi) +$$

$$c_{i+2+2kM}\cdot\alpha_2\cos(\theta_k+\phi)\} - \left[\sum_{i=2M-2}^{2M-1} c_{i+2kM}\cdot\right.$$

$$\{c_{i-2+2kM}\cdot\alpha_{-2}\cos(\theta_k+\phi) +$$

$$\left.c_{i+2+2kM}\cdot\alpha_2\cos(\theta_{k+1}+\phi)\}\right] +$$

$$\cos(\theta_k+\theta_0)\left[\sum_{i=1}^{2M-2} c_{i+2kM}\cdot\right.$$

$$\{c_{i-1+2kM}\cdot\alpha_{-1} - c_{i+1+2kM}\cdot\alpha_1\}\bigg] +$$

$$c_{2kM}\cdot[c_{2kM-1}\cdot\alpha_{-1}\cos(\theta_{k-1}+\phi) -$$

$$\left.c_{2kM+1}\cdot\alpha_1\cos(\theta_{k+1}+\phi)]\right\}$$

where $$\alpha_n = g(nT_c + \Delta T_c). \quad \text{(eqn 37)}$$

These equations show that the cross-correlation properties of the spreading sequence across the signal impact both the despread I and Q symbol signals. As shown in these equations, the spreading code property for 1 and 2 chip delay cross-correlation property for the 2M chips impact the despread I and Q signals. Detecting the first symbol and dropping the cross symbol spreading terms results in the following equations for the first despread I and Q symbol signals:

$$I(0) = \cos(\theta_0+\phi)\left[2M\cdot\alpha_0 - (\alpha_{-2}+\alpha_2)\sum_{i=0}^{2M-3} c_i\cdot c_{i+2}\right] - \quad \text{(eqn 38)}$$

$$\sin(\theta_0+\phi)\left[(\alpha_{-1}-\alpha_1)\sum_{i=0}^{2M-2} c_i\cdot c_{i+1}\right]$$

and $$Q(0) = -\left\{\sin(\theta_0+\phi)\left[2M\cdot\alpha_0 - (\alpha_{-2}+\alpha_2)\sum_{i=0}^{2M-3} c_i\cdot c_{i+2}\right] +\right. \quad \text{(eqn 39)}$$

$$\left.\cos(\theta_0+\phi)\left[(\alpha_{-1}-\alpha_1)\sum_{i=0}^{2M-2} c_i\cdot c_{i+1}\right]\right\}.$$

These equations show that the spreading sequence properties and the chip timing error, which impacts the $\alpha_n$ terms, affect the magnitude and phase of the despread I and Q symbol signals. The 2 chip delay cross-correlation for the spreading sequence reduces the magnitude of the desired term on both the I and Q signals. The 1 chip delay cross-correlation for the spreading sequence introduces a phase shift since it is orthogonal to the desired term on both the I and Q signals. From FIG. 9, the QBL-MSK autocorrelation value for the $\alpha_{-2}$ and $\alpha_2$ terms are less than or equal to 0.1, while the $\alpha_{-1}$ and $\alpha_1$ terms are as large as 0.67. Since the $\alpha_{-1}$ and $\alpha_1$ terms are so much larger than the $\alpha_{-2}$ and $\alpha_2$ terms and they introduce the undesired phase shift, these equations may be simplified by dropping the $\alpha_{-2}$ and $\alpha_2$ terms.

Computer simulation results for 8 chips per symbol (M=4) verified that the $\alpha_{-2}$ and $\alpha_2$ terms may be dropped without significant degradation in performance. Therefore, the phase correction process used by the present invention is based on only the $\alpha_{-1}$ and $\alpha_1$ terms. In another embodiment, however, this phase correction process may be easily modified to incorporate the $\alpha_{-2}$ and $\alpha_2$ terms.

Using only the $\alpha_{-1}$ and $\alpha_1$ terms (assuming $\alpha_0$ is approximately 1) in this exemplary embodiment reduces the despread first I and Q symbol signals to the following:

$$I(0) = 2M \cdot \cos(\theta_0 + \phi) - \sin(\theta_0 + \phi)\left[(\alpha_{-1} - \alpha_1)\sum_{i=0}^{2M-2} c_i \cdot c_{i+1}\right] \quad \text{(eqn 40)}$$

and $$Q(0) = \quad \text{(eqn 41)}$$
$$-\left\{2M \cdot \sin(\theta_0 + \phi) + \cos(\theta_0 + \phi)\left[(\alpha_{-1} - \alpha_1)\sum_{i=0}^{2M-2} c_i \cdot c_{i+1}\right]\right\}.$$

Applying the first symbol I and Q equations to the despread I and Q symbol signals results in the following equations for the despread I and Q symbol signals:

$$I(kT_s) = 2M \cdot \cos(\theta_k + \phi) - \sin(\theta_k + \phi) \quad \text{(eqn 42)}$$
$$\left[(\alpha_{-1} - \alpha_1)\sum_{i=0}^{2M-2} c_{i+2kM} \cdot c_{i+2kM+1}\right]$$
$$= A(k) \cdot \cos(\theta_k + \phi + \gamma(k))$$

and $$Q(kT_s) = -\{2M \cdot \sin(\theta_k + \phi) + \cos(\theta_k + \phi) \quad \text{(eqn 43)}$$
$$\left[(\alpha_{-1} - \alpha_1)\sum_{i=0}^{2M-2} c_{i+2kM} \cdot c_{i+2kM+1}\right]\}$$
$$= -A(k) \cdot \sin(\theta_k + \phi + \gamma(k));$$

where $$A(k) = \sqrt{4M^2 + \left[(\alpha_{-1} - \alpha_1)\sum_{i=0}^{2M-2} c_{i+2kM} \cdot c_{i+2kM+1}\right]^2} \quad \text{(eqn 44)}$$

and $$\gamma(k) = \tan^{-1}\left[\frac{(\alpha_{-1} - \alpha_1)\sum_{i=0}^{2M-2} c_{i+2kM} \cdot c_{i+2kM+1}}{2M}\right]. \quad \text{(eqn 45)}$$

The phase term $\gamma(k)$ represents the phase shift produced by the chip timing error and the spreading sequence property. Referring now to FIG. 15, the despread I and Q symbol signals are sent to phase correction module, generally designated as 171, to remove this phase error term and to recover the transmitted I and Q symbols.

As shown, the despread I and Q signals are first phase corrected using the spreading code property (SCP) and the chip timing error estimate for the SYNC/serial probe function. For QPSK data modulation, the detected I and Q symbols are obtained directly from the I and Q output of phase correction module 171. This assumes that coherent carrier phase tracking is performed on the signal to remove carrier frequency error and phase error. For DQPSK data modulation, differential detection is performed by differential detection module 182 to recover the I and Q symbols. DQPSK demodulation does not require the carrier frequency and phase tracking needed for QPSK.

Phase correction module 171 uses spreading code property (SCP) and chip timing estimates to determine the proper phase correction term. The spreading code property (SCP) is determined at spreading sequence autocorrelation determination module 184 by generating a 1 chip delay cross-correlation property for the 2M chips used to spread the symbol. For symbol k, the spreading code property is the following:

$$SCP(k) = \sum_{i=2kM}^{2M*(k+1)-2} c_i \cdot c_{i+1}; \quad \text{(eqn 46)}$$

where the chip values ($c_i$) equal −1 or +1 and the spreading is 2M chips per symbol as shown in FIG. 10. For 8 chips per symbol, as an example, M is equal to 4, which corresponds to 4 even and 4 odd chips per symbol, resulting in the following spreading code property equation:

$$SCP(k) = \sum_{i=8*k}^{8*(k+1)-2} c_i \cdot c_{i+1}. \quad \text{(eqn 47)}$$

The spreading code property {SCP(k)} determined at module 184 along with the chip timing error information {X1, Y1, Y2, and Y3} from the SYNC/serial probe function of FIG. 13 are used to provide a phase correction term $\gamma_1(k)$, which ideally equals $\gamma(k)$. The SYNC/serial probe function sets the chip timing error information across the message block between the SYNC and serial probe or between two serial probes, while the spreading code property is calculated for each symbol at spreading sequence module 184.

As an example, for 8 chips per symbol spreading, for a given symbol k, the value of SCP(k) takes on the value of −7, −5, −3, −1, 1, 3, 5, or 7. Using the spreading code property value for each symbol along with the chip timing estimation {X1, Y1, Y2, and Y3}, the proper phase correction for the symbol is selected based on a look up table, such as TABLE 1, designated as correction table 186 in FIG. 15. The table phase correction output, $\gamma_1(k)$, is an estimate of the actual phase error $\gamma(k)$.

The phase corrected I and Q symbol signals {$I_c(k)$ and $Q_c(k)$} are given by the following equations:

$$I_c(kT_s) = A(k) \cdot [\cos(\theta_k + \phi) \cdot \cos(\gamma_1(k)) + \quad \text{(eqn 48)}$$
$$\sin(\theta_k + \phi + \gamma(k)) \cdot \sin(\gamma_1(k))]$$
$$= A(k) \cdot \cos(\theta_k + \phi + \gamma(k) - \gamma_1(k))$$

and $$Q_c(kT_s) = A(k) \cdot [\sin(\theta_k + \phi) \cdot \cos(\gamma_1(k)) - \quad \text{(eqn 49)}$$
$$\cos(\theta_k + \phi + \gamma(k)) \cdot \sin(\gamma_1(k))]$$
$$= A(k) \cdot \sin(\theta_k + \phi + \gamma(k) - \gamma_1(k)).$$

As these equations show, if $\gamma_1(k)$ equals $\gamma(k)$, the phase error term goes to zero. Since phase correction table 186 has finite values, there is a small phase error term as shown in the improved BER performance curve of FIG. 4. To further simplify the phase correction process, the simplified cosine and sine tables, shown in TABLES 2 and 3, respectively, may be used in the phase correction process performed by phase correction module 171.

Implementation of the phase correction for each symbol is performed by phase correction module 171 using phase rotators, as shown in FIG. 15. In another embodiment, such as a rake receiver, phase correction operation may be performed for each rake tap. The phase correction parameters {X1, Y1, Y2, and Y3} for each independent rake tap along with the spreading code property for each symbol may be used to select the proper phase correction for each symbol on each rake tap in the demodulator.

Returning to FIG. 15, the despread I and Q signals, I(k) and Q(k), respectively, enter phase correction module 171 and are multiplied by phase correction signal cos [$\gamma_1(k)$] at mixers 170 and 180 and by phase correction signal sin [$\gamma_1(k)$] at mixers 174 and 176. The resulting signals from mixers 170 and 174 are then combined by summer 172 and the resulting signals from mixers 176 and 180 are combined by summer 178.

After phase correction, the I and Q data symbols are determined. For QPSK data modulation, the detected I and Q symbols are obtained directly from the I and Q outputs of phase correction module 171. This assumes that coherent carrier phase tracking is performed on the signal to remove carrier frequency error and phase error ($\phi$ given in equations 48 and 49). The corrected I and Q symbol signals {$I_c(k)$ and $Q_c(k)$} are each independently compared against zero to determine if a +1 (logic 0) or −1 (logic 1) was received for that corresponding symbol. For DQPSK demodulation, the corrected I and Q symbol signals {$I_c(k)$ and $Q_c(k)$} are processed by DQPSK differential detector 182 to determine the detected I and Q symbol signals {$I_d(k)$ and $Q_d(k)$}. The I and Q detected symbol signals output from the differential detector are each independently compared against zero to determine if a +1 (logic 0) or −1 (logic 1) was received for that corresponding symbol.

In summary, an aspect of the present invention reduces the BER performance degradation associated with QPSK or DQPSK data modulation on serial direct sequence spread waveforms, such as QBL-MSK, by providing a phase correction term based on the spreading sequence property and an estimate of the chip timing error. The phase correction term may also be used to enhance QPSK or DQPSK data detection for receivers operating at a sampling rate equal to the chip rate or for receivers operating at sampling rates greater than twice the chip rate. Operation at different sampling rates simply requires an appropriate change in the phase correction table.

The phase correction process described herein for QPSK/DQPSK may be expanded to include higher orders of phase modulation, such as 8-PSK and Differential 8-PSK. Also, the phase correction technique may be used to reduce the BER performance degradation associated with using π/4-QPSK or differential π/4-QPSK data modulation on a serial direct sequence spread waveform, such as QBL-MSK.

In addition to enabling changes to the data modulation type, the phase correction process may be used by applying serial formatting to other quadrature spreading modulation waveforms, such as Offset Quadrature Phase Shift Keying (OQPSK), Minimum Shift Keying (MSK), Gaussian MSK, Tamed Frequency Modulation (TFM), Intersymbol Jitter Free Offset Quadrature Phase Shift Keying (IJF-OQPSK), Raised Cosine Filtered Offset Quadrature Phase Shift Keying (RC-OQPSK), and bandwidth efficient Continuous Phase Modulation (CPM) schemes.

For other similar and non-similar disclosures, please refer to the following five applications filed on the same day as this application. These five applications are TBD (and, respectively, correspond to the following five provisional applications 60/703,180; 60/703,179; 60/703,373; 60/703,320 and 60/703,095). These applications are all incorporated herein by reference in their entireties.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

TABLE 1

Correction Phase (degrees) for Different Spreading Code Properties

| ΔTc | X1 | Y1 = X2 OR X3 | Y2 = X4 OR X5 | Y3 = X6 OR X7 | Correction Phase (degrees) for the Different 1*Tc Delay Summation Values | | | | | | |
|---|---|---|---|---|---|---|---|---|---|---|---|
| | | | | | 7 | 5 | 3 | 1 | −1 | −3 | −5 | −7 |
| −0.5000 | 0 | 1 | 1 | 0 | −5 | −3 | −2 | 0 | 0 | 2 | 3 | 5 |
| −0.4375 | 0 | 1 | 1 | 0 | −5 | −3 | −2 | 0 | 0 | 2 | 3 | 5 |
| −0.3750 | 0 | 1 | 0 | 0 | −15 | −10 | −5 | −2 | 2 | 5 | 10 | 15 |
| −0.3125 | 0 | 1 | 0 | 0 | −15 | −10 | −5 | −2 | 2 | 5 | 10 | 15 |
| −0.2500 | 0 | 1 | 0 | 0 | −15 | −10 | −5 | −2 | 2 | 5 | 10 | 15 |
| −0.1875 | 0 | 0 | 0 | 1 | 15 | 10 | 5 | 2 | −2 | −5 | −10 | −15 |
| −0.1250 | 0 | 0 | 0 | 1 | 15 | 10 | 5 | 2 | −2 | −5 | −10 | −15 |
| −0.0625 | 0 | 0 | 0 | 0 | 5 | 3 | 2 | 0 | 0 | −2 | −3 | −5 |
| 0.0000 | 0 | 0 | 0 | 0 | 5 | 3 | 2 | 0 | 0 | −2 | −3 | −5 |
| 0.0625 | 1 | 0 | 0 | 0 | −5 | −3 | −2 | 0 | 0 | 2 | 3 | 5 |
| 0.1250 | 1 | 0 | 0 | 1 | −15 | −10 | −5 | −2 | 2 | 5 | 10 | 15 |
| 0.1875 | 1 | 0 | 0 | 1 | −15 | −10 | −5 | −2 | 2 | 5 | 10 | 15 |
| 0.2500 | 1 | 1 | 0 | 0 | 15 | 10 | 5 | 2 | −2 | −5 | −10 | −15 |
| 0.3125 | 1 | 1 | 0 | 0 | 15 | 10 | 5 | 2 | −2 | −5 | −10 | −15 |
| 0.3750 | 1 | 1 | 0 | 0 | 15 | 10 | 5 | 2 | −2 | −5 | −10 | −15 |
| 0.4375 | 1 | 1 | 1 | 0 | 5 | 3 | 2 | 0 | 0 | −2 | −3 | −5 |
| 0.5000 | 1 | 1 | 1 | 0 | 5 | 3 | 2 | 0 | 0 | −2 | −3 | −5 |

TABLE 2

Correction Phase (Simplified Cosine Terms) for Different Spreading Code Properties

| Chip Timing $\Delta Tc$ | X1 | Y1 = X2 OR X3 | Y2 = X4 OR X5 | Y3 = X6 OR X7 | \multicolumn{7}{c}{Simplified Cosine Phase Correction Term for the Different Spreading Code Properties} |
|---|---|---|---|---|---|---|---|---|---|---|---|
| | | | | | 7 | 5 | 3 | 1 | −1 | −3 | −5 | −7 |
| −0.5000 | 0 | 1 | 1 | 0 | 1 | 1 | 1 | 1 | 1 | 1 | 1 | 1 |
| −0.4375 | 0 | 1 | 1 | 0 | 1 | 1 | 1 | 1 | 1 | 1 | 1 | 1 |
| −0.3750 | 0 | 1 | 0 | 0 | 0.96875 | 0.984375 | 1 | 1 | 1 | 1 | 0.984375 | 0.96875 |
| −0.3125 | 0 | 1 | 0 | 0 | 0.96875 | 0.984375 | 1 | 1 | 1 | 1 | 0.984375 | 0.96875 |
| −0.2500 | 0 | 1 | 0 | 0 | 0.96875 | 0.984375 | 1 | 1 | 1 | 1 | 0.984375 | 0.96875 |
| −0.1875 | 0 | 0 | 0 | 1 | 0.96875 | 0.984375 | 1 | 1 | 1 | 1 | 0.984375 | 0.96875 |
| −0.1250 | 0 | 0 | 0 | 1 | 0.96875 | 0.984375 | 1 | 1 | 1 | 1 | 0.984375 | 0.96875 |
| −0.0625 | 0 | 0 | 0 | 0 | 1 | 1 | 1 | 1 | 1 | 1 | 1 | 1 |
| 0.0000 | 0 | 0 | 0 | 0 | 1 | 1 | 1 | 1 | 1 | 1 | 1 | 1 |
| 0.0625 | 1 | 0 | 0 | 0 | 1 | 1 | 1 | 1 | 1 | 1 | 1 | 1 |
| 0.1250 | 1 | 0 | 0 | 1 | 0.96875 | 0.984375 | 1 | 1 | 1 | 1 | 0.984375 | 0.96875 |
| 0.1875 | 1 | 0 | 0 | 1 | 0.96875 | 0.984375 | 1 | 1 | 1 | 1 | 0.984375 | 0.96875 |
| 0.2500 | 1 | 1 | 0 | 0 | 0.96875 | 0.984375 | 1 | 1 | 1 | 1 | 0.984375 | 0.96875 |
| 0.3125 | 1 | 1 | 0 | 0 | 0.96875 | 0.984375 | 1 | 1 | 1 | 1 | 0.984375 | 0.96875 |
| 0.3750 | 1 | 1 | 0 | 0 | 0.96875 | 0.984375 | 1 | 1 | 1 | 1 | 0.984375 | 0.96875 |
| 0.4375 | 1 | 1 | 1 | 0 | 1 | 1 | 1 | 1 | 1 | 1 | 1 | 1 |
| 0.5000 | 1 | 1 | 1 | 0 | 1 | 1 | 1 | 1 | 1 | 1 | 1 | 1 |

TABLE 3

Correction Phase (Simplified Sine Terms) for Different Spreading Code Properties

| Chip Timing $\Delta Tc$ | X1 | Y1 = X2 OR X3 | Y2 = X4 OR X5 | Y3 = X6 OR X7 | \multicolumn{7}{c}{Simplified Sine Phase Correction Term for the Different Spreading Code Properties} |
|---|---|---|---|---|---|---|---|---|---|---|---|
| | | | | | 7 | 5 | 3 | 1 | −1 | −3 | −5 | −7 |
| −0.5000 | 0 | 1 | 1 | 0 | −0.09375 | −0.0625 | −0.03125 | 0 | 0 | 0.03125 | 0.0625 | 0.09375 |
| −0.4375 | 0 | 1 | 1 | 0 | −0.09375 | −0.0625 | −0.03125 | 0 | 0 | 0.03125 | 0.0625 | 0.09375 |
| −0.3750 | 0 | 1 | 0 | 0 | −0.25 | −0.1875 | −0.09375 | 0.03125 | 0.03125 | 0.09375 | 0.1875 | 0.25 |
| −0.3125 | 0 | 1 | 0 | 0 | −0.25 | −0.1875 | −0.09375 | −0.03125 | 0.03125 | 0.09375 | 0.1875 | 0.25 |
| −0.2500 | 0 | 1 | 0 | 0 | −0.25 | −0.1875 | −0.09375 | −0.03125 | 0.03125 | 0.09375 | 0.1875 | 0.25 |
| −0.1875 | 0 | 0 | 0 | 1 | 0.25 | 0.1875 | 0.09375 | 0.03125 | −0.03125 | −0.09375 | −0.1875 | −0.25 |
| −0.1250 | 0 | 0 | 0 | 1 | 0.25 | 0.1875 | 0.09375 | 0.03125 | −0.03125 | −0.09375 | −0.1875 | −0.25 |
| −0.0625 | 0 | 0 | 0 | 0 | 0.09375 | 0.0625 | 0.03125 | 0 | 0 | −0.03125 | −0.0625 | −0.09375 |
| 0.0000 | 0 | 0 | 0 | 0 | 0.09375 | 0.0625 | 0.03125 | 0 | 0 | −0.03125 | −0.0625 | −0.09375 |
| 0.0625 | 1 | 0 | 0 | 0 | −0.09375 | −0.0625 | −0.03125 | 0 | 0 | 0.03125 | 0.0625 | 0.09375 |
| 0.1250 | 1 | 0 | 0 | 1 | −0.25 | −0.1875 | −0.09375 | −0.03125 | 0.03125 | 0.09375 | 0.1875 | 0.25 |
| 0.1875 | 1 | 0 | 0 | 1 | −0.25 | −0.1875 | −0.09375 | −0.03125 | 0.03125 | 0.09375 | 0.1875 | 0.25 |
| 0.2500 | 1 | 1 | 0 | 0 | 0.25 | 0.1875 | 0.09375 | 0.03125 | −0.03125 | −0.09375 | −0.1875 | −0.25 |
| 0.3125 | 1 | 1 | 0 | 0 | 0.25 | 0.1875 | 0.09375 | 0.03125 | −0.03125 | −0.09375 | −0.1875 | −0.25 |
| 0.3750 | 1 | 1 | 0 | 0 | 0.25 | 0.1875 | 0.09375 | 0.03125 | −0.03125 | −0.09375 | −0.1875 | −0.25 |
| 0.4375 | 1 | 1 | 1 | 0 | 0.09375 | 0.0625 | 0.03125 | 0 | 0 | −0.03125 | −0.0625 | −0.09375 |
| 0.5000 | 1 | 1 | 1 | 0 | 0.09375 | 0.0625 | 0.03125 | 0 | 0 | −0.03125 | −0.0625 | −0.09375 |

What is claimed:

1. In a receiver, a method of correcting phase error of a phase shift keyed (PSK) signal, comprising the steps of:
   (a) receiving a signal modulated by a spreading sequence;
   (b) despreading the received signal using a receiver spreading sequence similar to the spreading sequence of step (a);
   (c) calculating a crosscorrelation profile between the receiver spreading sequence and the received signal;
   (d) calculating an autocorrelation profile of the receiver spreading sequence to determine a spreading code property (SCP);
   (e) estimating a timing error in alignment between the autocorrelation and the crosscorrelation profiles; and
   (f) correcting a phase error of the signal despread in step (c), by using the SCP and the estimated timing error.

2. The method of claim 1, wherein the received signal includes pulses at a chip rate, and
   step (a) includes:
   demodulating the received signal with a carrier signal to form a baseband signal,
   sampling the baseband signal at a rate greater than the chip rate, and
   step (b) includes:
   despreading the baseband signal at a rate that is the same as the chip rate.

3. The method of claim 2, wherein
   demodulating includes forming inphase (I) and quadrature (Q) baseband signals, and
   despreading includes despreading the I and Q baseband signals using only one receiver spreading sequence.

4. The method of claim 1, wherein the received signal includes pulses at a chip rate, and between step (a) and step (b) the following steps are performed:

phase rotating the received signal to form serially demodulated I and Q baseband signals, each sampled at a rate greater than the chip rate, reducing the sampled I and Q baseband signals by at least a factor of ½ to form decimated I and Q baseband signals, each sampled at the chip rate, and despreading the decimated I and Q baseband signals using the receiver spreading sequence at the chip rate.

5. The method of claim 4, wherein
despreading the decimated I and Q baseband signals is performed using a single receiver spreading sequence.

6. The method of claim 1, wherein
step (a) includes demodulating the received signal to form I and Q baseband signals, and step (c) includes separately crosscorrelating the I and Q baseband signals with a sequence of chips of the receiver spreading sequence to form an I correlated signal and a Q correlated signal.

7. The method of claim 6 wherein
the I and Q correlated signals are summed to form the crosscorrelation profile.

8. The method of claim 7 wherein
prior to summing, the I and Q correlated signals are individually squared.

9. The method of claim 1 wherein
step (d) includes time shifting the receiver spreading sequence against the same receiver spreading sequence by a maximum time of two chip periods of the receiver spreading sequence.

10. The method of claim 9 wherein
the time shifting is a maximum time of one chip period.

11. The method of claim 1 wherein
the received signal includes data symbols, each symbol including an integer number of chips, and step (d) includes determining the SCP for at least one symbol.

12. The method of claim 11 wherein for 8 chips per symbol, the SCP for a data symbol takes on values of $-7, -5, -3, -1, 1, 3, 5$ or $7$.

13. The method of claim 1 wherein
step (e) includes the steps of:

locating a peak value of the crosscorrelation profile as COR $(nTc)$, where Tc is a chip period and n is a sample number;

determining a value of a sample of the crosscorrelation profile after the peak value, as COR $([n+1]Tc)$ and a value of another sample of the crosscorrelation profile before the peak value, as COR $([n-1]Tc)$; and using the values of COR $(nTc)$, COR $([n-1]Tc)$ and COR $([n+1]Tc)$ to estimate the timing error.

14. The method of claim 1 wherein
an estimated timing error, estimated in step (e), and the SCP, determined in step (d), are used to select a phase error stored in a look-up-table (LUT), and step (f) uses the selected phase error to correct the phase error of the signal despread in step (c).

15. The method of claim 1 wherein
step (f) includes using values of degrees, or values of sine/cosine terms, stored in a look-up-table (LUT) to correct the phase error of the signal despread in step (c).

16. The method of claim 1 wherein
step (b) includes despreading the received signal into a despread I and Q baseband signals, and step (f) includes correcting the phase error of the despread I and Q baseband signals using values of sine and cosine terms stored in a look-up-table (LUT) to form phase corrected I and Q symbols for quadrature PSK (QPSK) detection.

17. The method of claim 1 wherein
the received signal includes one of QPSK, differential QPSK, QBL-MSK, 8-PSK, differential 8-PSK, π/4-QPSK, differential π/4-QPSK, BPSK, or differential BPSK.

18. A receiver comprising
a despreading module for despreading a baseband signal, using a spreading sequence generated by a code generator, a crosscorrelation module for calculating a crosscorrelation profile between the baseband signal and the spreading sequence, an autocorrelation module for calculating an autocorrelation profile of the spreading sequence to determine a SCP value of the spreading sequence, an error timing estimating module, coupled to the crosscorrelation and autocorrelation modules, for estimating an alignment error between the autocorrelation profile and the crosscorrelation profile, and a phase correction module, coupled to the error timing estimating module and the despreading module, for correcting a phase error in the despread baseband signal; wherein the phase correction module is configured to extract phase error correction values from a look-up-table (LUT), the LUT including the phase error correction values based on SCP values and alignment errors between the autocorrelation and crosscorrelation profiles.

19. The receiver of claim 18 including
a demodulator for mixing a carrier signal with a received signal, including a chipping rate of pulses, to form a demodulated signal, an analog-to-digital converter (ADC) configured to sample the demodulated signal, at a sampling rate greater than the chipping rate, to form a sampled signal, a phase rotator for phase rotating the sampled signal to form a serially demodulated signal at the same sampling rate, and a decimator for reducing the sampling rate of the serially demodulated signal to form the baseband signal.

20. The receiver of claim 19 wherein the baseband signal includes a baseband I signal and a baseband Q signal, and
the same spreading sequence is used to despread the baseband I and Q signals.

21. The receiver of claim 18 wherein
the phase correction module includes multipliers for multiplying the despread baseband signal with sine and cosine values extracted from the (LUT).

22. The receiver of claim 18 wherein the baseband signal is one of QPSK, differential QPSK, QBL-MSK, 8-PSK, differential 8-PSK, π4-QPSK, or differential π/4-QPSK.

* * * * *